(12) United States Patent
Li et al.

(10) Patent No.: US 12,733,019 B2
(45) Date of Patent: Sep. 8, 2026

(54) METHOD AND APPARATUS FOR HANDLING MULTIPLEXING OF SIDELINK REFERENCE SIGNAL IN A WIRELESS COMMUNICATION SYSTEM

(71) Applicant: ASUS Technology Licensing Inc., Taipei City (TW)

(72) Inventors: Ming-Che Li, Taipei City (TW); Li-Chih Tseng, Taipei City (TW)

(73) Assignee: ASUS Technology Licensing Inc., Taipei City (TW)

( * ) Notice: Subject to any disclaimer, the term of this patent is extended or adjusted under 35 U.S.C. 154(b) by 0 days.

(21) Appl. No.: 18/944,559

(22) Filed: Nov. 12, 2024

(65) Prior Publication Data

US 2025/0159700 A1 May 15, 2025

Related U.S. Application Data

(60) Provisional application No. 63/598,527, filed on Nov. 13, 2023.

(51) Int. Cl.

| | |
|---|---|
| ***H04W 72/25*** | (2023.01) |
| ***H04B 7/06*** | (2006.01) |
| ***H04L 27/26*** | (2006.01) |
| ***H04W 72/1263*** | (2023.01) |

(52) U.S. Cl.
CPC .......... *H04W 72/25* (2023.01); *H04B 7/0626* (2013.01); *H04L 27/261* (2013.01); *H04W 72/1263* (2013.01)

(58) Field of Classification Search
CPC ......................... H04W 72/25; H04W 72/1263; H04B 7/0626; H04L 27/261
See application file for complete search history.

(56) References Cited

U.S. PATENT DOCUMENTS

| | | | | |
|---|---|---|---|---|
| 2024/0089893 | A1 | 3/2024 | Masal et al. | |
| 2024/0147501 | A1* | 5/2024 | Zhou | H04L 5/0048 |
| 2024/0155540 | A1* | 5/2024 | Kim | H04W 76/14 |
| 2024/0172167 | A1* | 5/2024 | Wang | H04W 72/25 |

FOREIGN PATENT DOCUMENTS

| | | | | |
|---|---|---|---|---|
| WO | WO-2022139093 A1 * | 6/2022 | | H04W 76/14 |
| WO | WO-2023211905 A1 * | 11/2023 | | G01S 5/0205 |
| WO | WO-2025011271 A1 * | 1/2025 | | |

* cited by examiner

*Primary Examiner* — Marcus Smith
*Assistant Examiner* — Zhaohui Yang
(74) *Attorney, Agent, or Firm* — Skaar Ulbrich Macari, P.A.

(57) ABSTRACT

Methods, systems, and apparatuses are provided for handling multiplexing of sidelink reference signals in a wireless communication system, wherein a method of a first device comprises receiving a configuration of a first sidelink resource pool for sidelink data transmission and/or sidelink reference signal, performing an initial sidelink data transmission for transmitting a sidelink data packet, and performing a first sidelink data retransmission, for transmitting the sidelink data packet, with multiplexing a first sidelink reference signal transmission, wherein the first sidelink reference signal transmission is available or triggered after the initial sidelink data transmission.

22 Claims, 9 Drawing Sheets

METHOD AND APPARATUS FOR HANDLING MULTIPLEXING OF SIDELINK REFERENCE SIGNAL IN A WIRELESS COMMUNICATION SYSTEM

CROSS-REFERENCE TO RELATED APPLICATIONS

The present Application claims priority to and the benefit of U.S. Provisional Patent Application Ser. No. 63/598,527, filed Nov. 13, 2023, which is fully incorporated herein by reference.

FIELD

This disclosure generally relates to wireless communication networks and, more particularly, to a method and apparatus for handling multiplexing of sidelink reference signals in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods, systems, and apparatuses are provided for handling multiplexing of sidelink reference signals in a wireless communication system to avoid unnecessary restrictions and reduce latency on Sidelink Positioning Reference Signal (SL PRS) multiplexing, SL PRS resource determination, and SL PRS requests.

In various embodiments, a method of a first device comprises receiving a configuration of a first sidelink resource pool for sidelink data transmission and/or sidelink reference signal, performing an initial sidelink data transmission for transmitting a sidelink data packet, and performing a first sidelink data retransmission, for transmitting the sidelink data packet, with multiplexing a first sidelink reference signal transmission, wherein the first sidelink reference signal transmission is available or triggered after the initial sidelink data transmission.

In various embodiments, a method of a first device comprises receiving a configuration of a first sidelink resource pool from a network for sidelink data transmission and/or sidelink reference signal, performing a new sidelink data transmission for transmitting a sidelink data packet to a second device, triggering a first sidelink reference signal transmission based on a signaling sent from the second device or based on an upper layer of the first device, and determining whether to multiplex the first sidelink reference signal transmission with a first sidelink data retransmission based on whether the first sidelink reference signal is available for the second device and performing the first sidelink data retransmission, for transmitting the sidelink data packet to the second device.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1] 3GPP TS 38.213 V18.0.0 (2023-09) 3GPP; TSG RAN; NR; Physical layer procedures for control (Release 18); [2] 3GPP TS 38.214 V18.0.0 (2023-09) 3GPP; TSG RAN; NR; Physical layer procedures for data (Release 18); [3] 3GPP TS 38.212 V18.0.0 (2023-09) 3GPP; TSG RAN; NR; Multiplexing and channel coding (Release 18); [4] 3GPP TS 38.211 V18.0.0 (2023-09) 3GPP; TSG RAN; NR; Physical channels and modulation (Release 18); [5] R2-2312264, "Draft running MAC CR for the introduction of Sidelink Positioning", Huawei, HiSilicon; [6] RAN1 Chair's Notes of 3GPP TSG RAN WG1 #112bis; [7] RAN1 Chair's Notes of 3GPP TSG RAN WG1 #113; [8] RAN1 Chair's Notes of 3GPP TSG RAN WG1 #114; and [9] RAN1 Chair's Notes of 3GPP TSG RAN WG1 #114bis. The standards and documents listed above are hereby expressly and fully incorporated herein by reference in their entirety.

Figure 1:
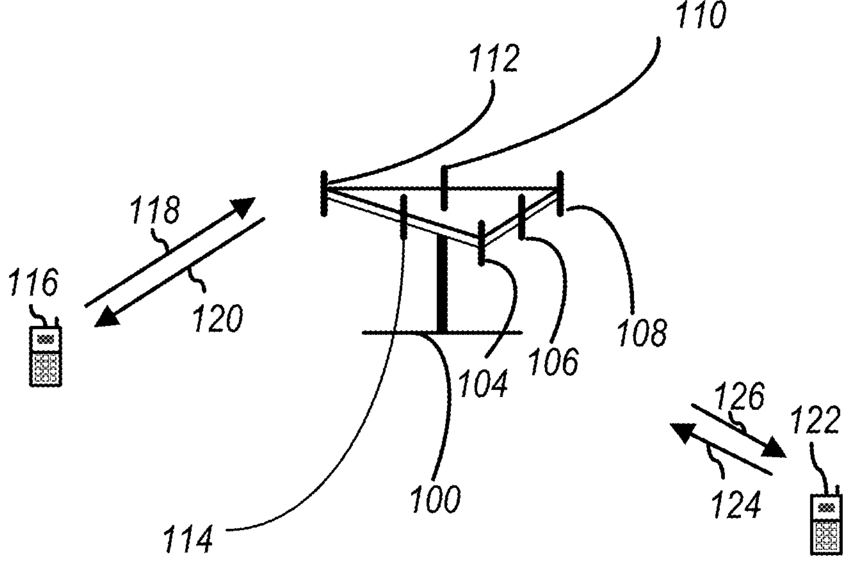
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
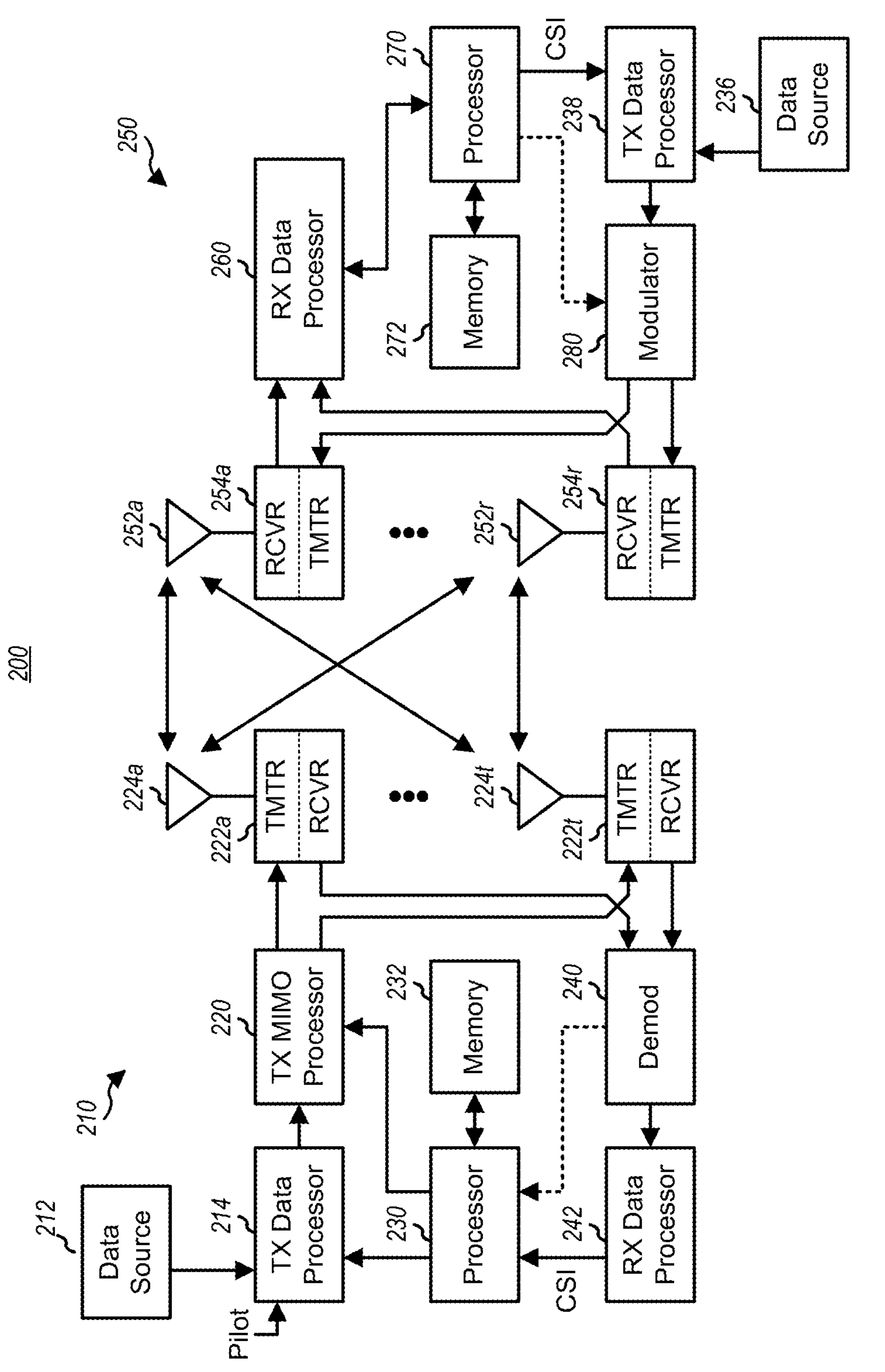
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230. A memory 232 is coupled to processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222*a* through 222*t*. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222*a* through 222*t* are then transmitted from $N_T$ antennas 224*a* through 224*t*, respectively.

At receiver system 250, the transmitted modulated signals are received by $N_R$ antennas 252*a* through 252*r* and the received signal from each antenna 252 is provided to a respective receiver (RCVR) 254*a* through 254*r*. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide Nr "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254*a* through 254*r*, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
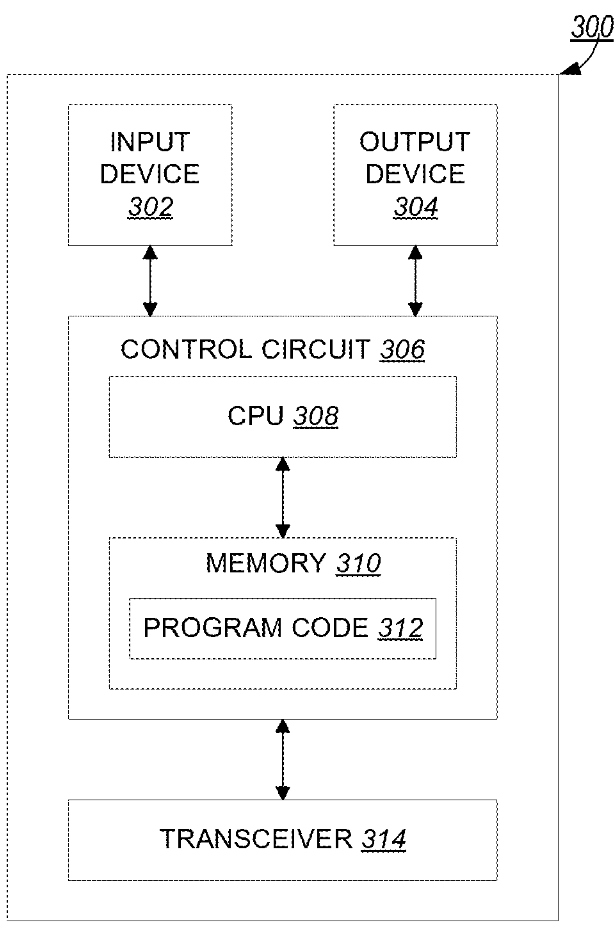
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
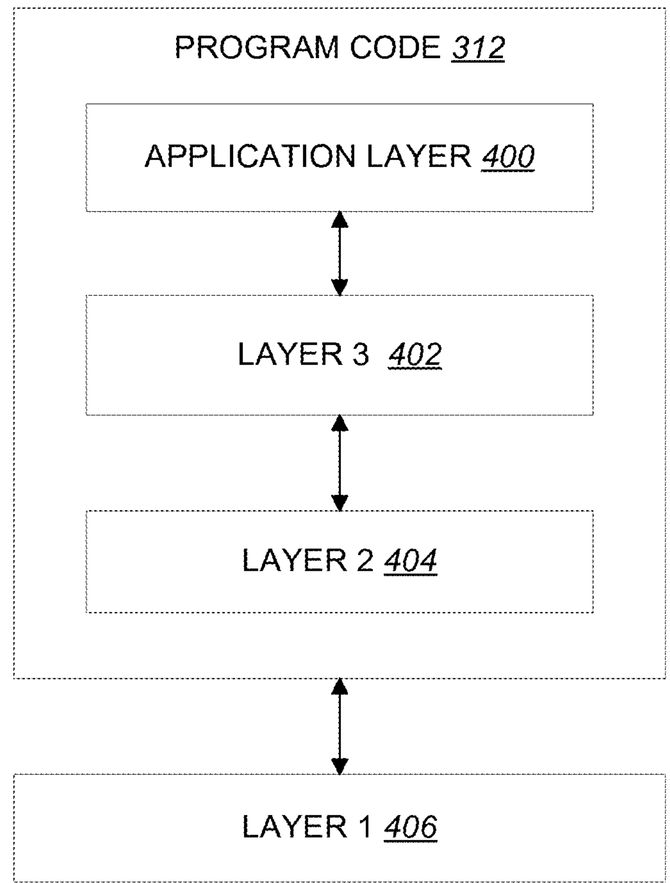
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or NR systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-)bullets, points, actions, or claims described in each invention paragraph or section may be combined logically, reasonably, and properly to form a specific method.

Any sentence, paragraph, (sub-)bullet, point, action, or claim described in each of the following invention paragraphs or sections may be implemented independently and separately to form a specific method or apparatus. Dependency, e.g., "based on", "more specifically", "example", etc., in the following invention disclosure is just one possible embodiment which would not restrict the specific method or apparatus.

In TS 38.213 ([1] 3GPP TS 38.213 V18.0.0 (2023-09)), SL related procedure for control is specified.

16 UE Procedures for Sidelink

A UE is provided by SL-BWP-Config or SL-BWP-Config-Common a BWP for SL transmissions (SL BWP) with numerology and resource grid determined as described in [4, TS 38.211]. For a resource pool within the SL BWP, the UE is provided by sl-NumSubchannel a number of sub-channels where each sub-channel includes a number of contiguous RBs provided by sl-SubchannelSize. The first RB of the first sub-channel in the SL BWP is indicated by sl-StartRB-Subchannel. Available slots for a resource pool are provided by sl-TimeResource and occur with a periodicity of 10240 ms. For an available slot without S-SS/PSBCH blocks, SL transmissions can start from a first symbol indicated by sl-StartSymbol and be within a number of consecutive symbols indicated by sl-LengthSymbols. For an available slot with S-SS/PSBCH blocks, the first symbol and the number of consecutive symbols is predetermined.

16.4 UE Procedure for Transmitting PSCCH

A UE can be provided a number of symbols in a resource pool, by sl-TimeResourcePSCCH, starting from a second symbol that is available for SL transmissions in a slot, and a number of PRBs in the resource pool, by sl-FreqResourcePSCCH, starting from the lowest PRB index of the lowest sub-channel index, in an RB-set with a lowest index if applicable, of the associated PSSCH for a PSCCH transmission with a SCI format 1-A.

16.4A UE Procedure for Transmitting PSCCH in Dedicated Resource Pool for SL PRS

For a resource pool dedicated for SL PRS transmissions, a UE can be provided a number of symbols in the resource pool, by sl-TimeResourcePSCCH, starting from a second symbol that is available for SL transmissions in a slot, and a number of PRBs in the resource pool, by sl-FreqResourcePSCCH, for a PSCCH transmission with a SCI format 1-B.

A UE that transmits a PSCCH with SCI format 1-B using SL PRS resource allocation scheme 2 [6, TS 38.214] sets A UE that transmits a PSCCH with SCI format 1-B using SL PRS resource allocation scheme 1 [6, TS 38.214] sets In TS 38.214 ([2] 3GPP TS 38.214 V18.0.0 (2023-09)), SL related procedure for data is specified.

8 Physical Sidelink Shared Channel Related Procedures

A UE can be configured by higher layers with one or more sidelink resource pools. A sidelink resource pool can be for transmission of PSSCH, as described in Clause 8.1, and/or SL PRS, as described in Clause 8.2.4, or for reception of PSSCH, as described in Clause 8.3, and/or SL PRS, as described in Clause 8.4.4, and can be associated with either sidelink resource allocation mode 1 or sidelink resource allocation mode 2.

A sidelink resource pool which can be used for transmission of both SL PRS and PSSCH will be referred to as shared resource pool.

A sidelink resource pool which can be used for transmission of SL PRS and cannot be used for transmission of PSSCH will be referred to as dedicated SL PRS resource pool.

In the frequency domain,

If the higher layer parameter transmissionStructureForPSCCHandPSSCH is not provided, or it is set to 'contiguousRB', a sidelink resource pool consists of sl-NumSubchannel contiguous sub-channels. A sub-channel consists of sl-SubchannelSize contiguous PRBs, where sl-NumSubchannel and sl-SubchannelSize are higher layer parameters.

The set of slots that may belong to a sidelink resource pool is denoted by $$\left(t_0^{SL}, t_1^{SL}, t_{T_{max}-1}^{SL}\right)$$

where $$0 \le t_i^{SL} < 10240 \times 2^{\mu}, 0 \le i < T_{max},$$

the slot index is relative to slot #0 of the radio frame corresponding to SFN 0 of the serving cell or DFN 0, the set includes all the slots except the following slots, $N_{S\text{-}SSB}$ slots in which S-SS/PSBCH block (S-SSB) or additional transmission occasion for S-SSB is configured, $N_{nonSL}$ slots in each of which at least one of Y-th, (Y+1)-th, . . . , (Y+X−1)-th OFDM symbols are not semi-statically configured as UL as per the higher layer parameter tdd-UL-DL-ConfgurationCommon of the serving cell if provided or sl-TDD-Configuration if provided or sl-TDD-Config of the received PSBCH if provided, where Y and X are set by the higher layer parameters sl-StartSymbol and sl-LengthSymbols, respectively.

The reserved slots which are determined by the following steps.

1) the remaining slots excluding $N_{S\text{-}SSB}$ slots and $N_{nonSL}$ slots from the set of all the slots are denoted by $(l_0, l_1, \ldots, l_{(10240\times2^{\mu}-N_{S\text{-}SSB}-N_{nonSL}-1)})$ arranged in increasing order of slot index.

2) a slot $l_r$ $(0 \le r < 10240\times2^{\mu}-N_{S\text{-}SSB}-N_{non\text{-}SL})$ belongs to the reserved slots if r=

$$\left\lfloor \frac{m \cdot (10240 \times 2^{\mu} - N_{S-SSB} - N_{nonSL})}{N_{reserved}} \right\rfloor,$$

here m=0,1, . . . , $N_{reserved}-1$ and $N_{reserved}=(10240\times 2^{\mu}-N_{S\text{-}SSB}-N_{nonSL}) \bmod L_{bitmap}$ where $L_{bitmap}$ denotes the length of bitmap configured by higher layers.

The slots in the set are arranged in increasing order of slot index.

The UE determines the set of logical slots assigned to a sidelink resource pool as follows:

a bitmap $(b_0, b_1, \ldots, b_{L_{bitmap}-1})$ associated with the resource pool is used where $L_{bitmap}$ the length of the bitmap is configured by higher layers.

a slot $$t_k^{SL}(0 \le k < 10240 \times 2^{\mu} - N_{S-SSB} - N_{nonSL} - N_{reserved})$$

belongs to the set if $b_{k'}=1$ where k'=k mod $L_{bitmap}$.

The slots in the set are re-indexed such that the subscripts i of the remaining slots $$t_i'^{SL}$$

are successive (0, 1, . . . , $T'_{max}-1$) where $T'_{max}$ is the number of the slots remaining in the set.

The UE determines the set of resource blocks assigned to a sidelink resource pool as follows:

The resource block pool consists of $N_{PRB}$ PRBs.

If the higher layer parameter transmissionStructureForPSCCHandPSSCH is not provided, or is set to 'contiguousRB', the sub-channel m for m=0,1, . . . , numSubchannel−1 consists of a set of $n_{subCHsize}$ contiguous resource blocks with the physical resource block number $n_{PRB}=n_{subCHRBstart}+m\cdot n_{subCHsize}+j$ for j=0,1, . . . , $n_{subCHsize}-1$, where $n_{subCHRBstart}$, $n_{subCHsiz}$, and numSubchannel are given by higher layer parameters sl-StartRB-Subchannel, sl-SubchannelSize and sl-NumSubchannel, respectively.

8.1 UE Procedure for Transmitting the Physical Sidelink Shared Channel

Each PSSCH transmission is associated with an PSCCH transmission.

That PSCCH transmission carries the 1st stage of the SCI associated with the PSSCH transmission; the 2nd stage of the associated SCI is carried within the resource of the PSSCH.

If the UE transmits SCI format 1-A on PSCCH according to a PSCCH resource configuration in slot n and PSCCH resource m, then for the associated PSSCH transmission in the same slot one transport block is transmitted with up to two layers;

The UE shall set the contents of the SCI format 2-A as follows:

the UE shall set value of the 'HARQ process number' field as indicated by higher layers.

the UE shall set value of the 'NDI' field as indicated by higher layers.

the UE shall set value of the 'Redundancy version' field as indicated by higher layers.

the UE shall set value of the 'Source ID' field as indicated by higher layers.

the UE shall set value of the 'Destination ID' field as indicated by higher layers.

the UE shall set value of the 'HARQfeedback enabled/disabled indicator' field as indicated by higher layers.

the UE shall set value of the 'Cast type indicator' field as indicated by higher layers.

the UE shall set value of the 'CSI request' field as indicated by higher layers.

[the UE shall set value of the 'CAPC' field as indicated by higher layers.

the UE shall set value of the 'COT sharing cast type' field as indicated by higher layers.

the UE shall set value of the 'COT sharing Additional ID' field as indicated by higher layers.

the UE shall set value of the 'Remaining COT duration' field as indicated by higher layers.]

The UE shall set the contents of the SCI formats 2-B as follows:

the UE shall set value of the 'HARQ process number' field as indicated by higher layers.

the UE shall set value of the 'NDI' field as indicated by higher layers.

the UE shall set value of the 'Redundancy version' field as indicated by higher layers.

the UE shall set value of the 'Source ID' field as indicated by higher layers.

the UE shall set value of the 'Destination ID' field as indicated by higher layers.

the UE shall set value of the 'HARQfeedback enabled/disabled indicator' field as indicated by higher layers.

the UE shall set value of the 'Zone ID' field as indicated by higher layers.

the UE shall set the 'Communication range requirement' field as indicated by higher layers.

[the UE shall set value of the 'CAPC' field as indicated by higher layers.

the UE shall set value of the 'COT sharing cast type' field as indicated by higher layers the UE shall set value of the 'COT sharing Additional ID' field as indicated by higher layers.

the UE shall set value of the 'Remaining COT duration' field as indicated by higher layers.]

The UE shall set the contents of the SCI format 2-C as follows:

the UE shall set value of the 'HARQ process number' field as indicated by higher layers.

the UE shall set value of the 'NDI' field as indicated by higher layers.

the UE shall set value of the 'Redundancy version' field as indicated by higher layers.

the UE shall set value of the 'Source ID' field as indicated by higher layers.

the UE shall set value of the 'Destination ID' field as indicated by higher layers.

the UE shall set value of the 'HARQfeedback enabled/disabled indicator' field as indicated by higher layers.

the UE shall set value of the 'CSI request' field as indicated by higher layers.

the UE shall set value of 'Providing/Requesting indicator' field as indicated by higher layers.

[the UE shall set value of the 'CAPC' field as indicated by higher layers.

the UE shall set value of the 'COT sharing cast type' field as indicated by higher layers the UE shall set value of the 'COT sharing Additional ID' field as indicated by higher layers.

the UE shall set value of the 'Remaining COT duration' field as indicated by higher layers.]

if 'Providing/Requesting indicator' indicates SCI format 2-C is used to convey an explicit request for inter-UE coordination information:

the UE shall set value of the 'Priority' field as indicated by higher layers.

the UE shall set value of the 'Number of subchannels' field as indicated by higher layers.

the UE shall set value of the 'Resource reservation period' field as indicated by higher layers.

the UE shall set value of the 'Resource selection window location' field as indicated by higher layers.

the UE shall set value of the 'Resource set type' field as indicated by higher layers if higher layer parameter sl-DetermineResourceType is configured to 'UE-B's request'; otherwise this field is omitted.

if 'Providing/Requesting indicator' indicates SCI format 2-C is used to convey inter-UE coordination information:

the UE shall set value of the 'Resource set type' field as indicated by higher layers.

the UE shall set value of the 'Resource combination(s)' field (clause 8.1.5A) as indicated by higher layers.

the UE shall set value of the 'Lowest subchannel indices' as indicated by higher layers the UE shall set value of the 'First resource location' as indicated by higher layers the UE shall set value of the 'Reference slot location' as indicated by higher layers The UE shall set the contents of the SCI format 2-D as follows:

the UE shall set value of the '[SL PRS resource ID]' field as indicated by higher layers.

the UE shall set value of the '[SL PRS request]' field as indicated by higher layers.

the UE shall set value of the '[Embedded SCI format]' field as indicated by higher layers.

if 'Embedded SCI format' indicates that SCI format 2-A is embedded within this SCI format 2-D then the UE shall include in the '[Embedded SCI format payload]' field the fields of SCI format 2-A, set as specified above, and add necessary padding such that the size of the SCI format 2-D is the same as if SCI format 2-B was embedded.

if 'Embedded SCI format' indicates that SCI format 2-B is embedded within this SCI format 2-D then the UE shall include in the '[Embedded SCI format payload]' field the fields of SCI format 2-B, set as specified above.

8.1.1 Transmission Schemes

Only one transmission scheme is defined for the PSSCH and is used for all PSSCH transmissions.

PSSCH transmission is performed with up to two antenna ports, with antenna ports 1000-1001 as defined in clause 8.2.4 of [4, TS 38.211].

8.1.2 Resource Allocation

In sidelink resource allocation mode 1:

for PSSCH and PSCCH transmission, dynamic grant, configured grant type 1 and configured grant type 2 are supported. The configured grant Type 2 sidelink transmission is semi-persistently scheduled by a SL grant in a valid activation DCI according to Clause 10.2A of [6, TS 38.213].

8.1.2.1 Resource Allocation in Time Domain

The UE shall transmit the PSSCH in the same slot as the associated PSCCH.

The minimum resource allocation unit in the time domain is a slot.

The UE shall transmit the PSSCH in consecutive symbols within the slot, subject to the following restrictions:

The UE shall not transmit PSSCH in symbols which are not configured for sidelink. A symbol is configured for sidelink, according to higher layer parameters sl-StartSymbol and sl-LengthSymbols, where sl-StartSymbol is the symbol index of the first symbol of sl-LengthSymbols consecutive symbols configured for sidelink.

Within the slot, PSSCH resource allocation starts at symbol sl-StartSymbol+1, except when startingSymbolFirst and startingSymbolSecond are provided for a SL-BWP. If startingSymbolFirst and startingSymbolSecond are provided for the SL-BWP, there are 2 candidate starting symbols for PSSCH transmission for slots without PSFCH symbols. PSSCH resource allocation starts at the next symbol after each candidate starting symbol. In a slot, the UE may use the second candidate starting symbol, provided by startingSymbolSecond, only if it fails to access the channel prior to the first starting symbol provided by startingSymbol- First. The UE shall not use the second starting symbol in slots with PSFCH symbols.

The UE shall not transmit PSSCH in symbols which are configured for use by PSFCH, if PSFCH is configured in this slot.

The UE shall not transmit PSSCH in the last symbol configured for sidelink.

The UE shall not transmit PSSCH in the symbol immediately preceding the symbols which are configured for use by PSCH, if PSFCH is configured in this slot.

8.1.2.2 Resource Allocation in Frequency Domain

The resource allocation unit in the frequency domain is the sub-channel.

The sub-channel assignment for sidelink transmission is determined using the "Frequency resource assignment" field in the associated SCI.

The lowest sub-channel for sidelink transmission is the sub-channel on which the lowest PRB of the associated PSCCH is transmitted.

If a PSSCH scheduled by a PSCCH would overlap with resources containing the PSCCH, the resources corresponding to a union of the PSCCH that scheduled the PSSCH and associated PSCCH DM-RS are not available for the PSSCH.

8.1.4 UE Procedure for Determining the Subset of Resources to be Reported to Higher Layers in PSSCH Resource Selection in Sidelink Resource Allocation Mode 2

In resource allocation mode 2, the higher layer can request the UE to determine a subset of resources from which the higher layer will select resources for PSSCH/PSCCH transmission. To trigger this procedure, in slot n, the higher layer provides the following parameters for this PSSCH/PSCCH transmission:

8.1.5 UE Procedure for Determining Slots and Resource Blocks for PSSCH Transmission Associated with an SCI Format 1-A The set of slots and resource blocks for PSSCH transmission is determined by the resource used for the PSCCH transmission containing the associated SCI format 1-A, and fields 'Frequency resource assignment', 'Time resource assignment' of the associated SCI format 1-A as described below.

8.2 UE Procedure for Transmitting Sidelink Reference Signals 8.2.1 CSI-RS Transmission Procedure A UE transmits sidelink CSI-RS within a unicast PSSCH transmission if the following conditions hold:

CSI reporting is enabled by higher layer parameter sl-CSI-Acquisition; and the 'CSI request' field in the corresponding SCI format 2-A or 2-C is set to 1.

The following parameters for CSI-RS transmission are configured for each CSI-RS configuration:

sl-CSI-RS-FirstSymbol indicates the first OFDM symbol in a PRB used for SL CSI-RS sl-CSI-RS-FreqAllocation indicates the number of antenna ports and the frequency domain allocation for SL CSI-RS.

8.2.4 SL PRS Transmission Procedure

The following parameters for SL PRS transmission are associated with each SL PRS resource:

[SL PRS resource ID] indicates an identity of a SL PRS resource. The SL PRS resource is identified by the SL PRS resource ID that is unique within a slot of a dedicated SL PRS resource pool. For a shared resource pool, a SL PRS resource is uniquely identified by a combination of the SL PRS resource ID and a SL PRS frequency domain allocation within a slot.

[SL PRS comb offset and comb size] indicates a comb offset and a comb size of the SL PRS resource

[Starting symbol and the number of SL PRS symbols] indicates the starting symbol index within a slot and the number of symbols of the SL PRS resource.

[SL PRS frequency domain allocation] indicates the frequency location [and the number of resource blocks for SL PRS transmission in a shared resource pool.]

Each SL PRS transmission is associated with an PSCCH transmission in the same slot.

In the case of dedicated pool for SL positioning, that PSCCH carries the SCI format 1-B associated with the SL PRS transmission.

The UE may report the association information of the already transmitted SL PRS resources with UE Tx ARP ID.

8.2.4.1 Resource Allocation

In sidelink resource allocation mode 1:

For SL PRS transmission, a UE may be configured with dynamic grant, configured grant type 1, or configured grant type 2

8.2.4.1.1 Resource Allocation in Time Domain

The UE shall transmit the SL PRS in the same slot as the associated PSCCH.

The UE shall transmit the SL PRS in consecutive symbols within the slot.

A UE does not transmit multiple SL PRS resources in the same slot.

For a shared resource pool, the UE transmits the SL PRS in PSSCH symbols according to clause 8.1.2.1, [with the following restrictions:

the number of contiguous symbols for SL PRS transmission, 'M', shall correspond to one of the SL PRS resources in parameter.

the UE shall not transmit SL PRS in symbols where associated PSCCH is transmitted.

the UE shall not transmit SL PRS and PSSCH DMRS in the same symbol.

the UE shall transmit SL PRS on contiguous symbols either in between or after symbols where PSSCH DMRS is transmitted.

the UE shall transmit SL PRS only after the last symbol with second stage SCI.

For a given value of 'M', SL PRS resource is mapped to the last consecutive 'M' SL symbols in the slot that meet all the other restrictions The UE shall not transmit PSSCH and SL PRS in the same symbol.]

A SL-PRS resource and PSFCH (including the preceding gap symbol) are not mapped on the same symbols For a dedicated resource pool, the UE transmits SL PRS subject to the following restrictions:

the UE shall not transmit SL PRS and associated PSCCH in the same symbol;

the number of contiguous symbols and the starting symbol for SL PRS transmission shall correspond to one of the SL PRS resources in parameter [ ].

In sidelink resource allocation mode 1 for a shared resource pool, the time domain behaviour for sidelink dynamic grants and sidelink configured grants for SL PRS follows the behaviour in clause 8.1.2.1.

In sidelink resource allocation mode 1 for a dedicated resource pool, the time domain behaviour for sidelink dynamic grants and sidelink configured grants for SL PRS follows the behaviour in clause 8.1.2.1, with the following modifications:

["DCI format 3_0" is replaced by "DCI format 3_2"].

"PSSCH" is replaced by "SL PRS".

8.2.4.1.2 Resource Allocation in Frequency Domain

For a shared resource pool, the frequency domain resource assignment of a SL PRS resource is the same as PSSCH in the same slot.

For a dedicated resource pool, the frequency domain resource assignment of a SL PRS resource is same as frequency resources of a resource pool.

8.2.4.2 UE Procedure for Determining the Subset of Resources to be Reported to Higher Layers in SL PRS Resource Selection in a Dedicated Resource Pool in Sidelink Resource Allocation Mode 2

In resource allocation mode 2 in a dedicated resource pool, the higher layer can request the UE to determine a subset of resources from which the higher layer will select resources for SL PRS[/PSCCH]transmission. To trigger this procedure, in slot n, the higher layer provides the following parameters for this SL PRS[/PSCCH]transmission:

8.2.4.2 UE Procedure for Determining Slots and SL PRS Resource(s) Associated with an SCI Format 1-B in a Dedicated Resource Pool The set of slots and SL PRS resources for SL PRS transmission is determined by the PSCCH containing the associated SCI format 1-B, and fields '[SL-PRS resource ID (s))', '[Time resource assignment]' of the associated SCI format 1-B as described below.

The set of slots is determined as in clause 8.1.5, with the following modifications:

"SCI format 1-A" is replaced by "SCI format 1-B",

[potential parameter name changes].

The first SL PRS resource is determined according to the sub-channel used for the PSCCH transmission containing the associated SCI format 1-B: The index of the sub-channel in the resource pool is identical to the index of the SL PRS resource provided by [higher layer parameter].

If [sl-MaxNumPerReserve] is 2 then the index of the second SL PRS resource is indicated by the field [Resource ID indication].

[If [sl-MaxNumPerReserve] is 3 then the index of the second/third SL PRS resource is indicated by the field [Resource ID indication].]

If TRIV determined according to clause 8.1.5 indicates N<sl-MaxNumPerReserve, the SL PRS resource indices corresponding to sl-MaxNumPerReserve minus N last resources are not used.

The number of slots in one set of the time and frequency resources for transmission opportunities of SL PRS is given by $C_{reset}$ where $C_{reset}$=10*SL_RESOURCE_RESELECTION_COUNTER [10, TS 38.321] if configured else $C_{reset}$ is set to 1.

If a SL PRS resource in slot $$t_m'^{SL}$$

is determined as the time and frequency resource for SL PRS transmission corresponding to the selected sidelink grant (described in [10, TS 38.321]), the same SL PRS resource in slots $$t'^{SL}_{m+j\times P'_{rsvp\_TX}}$$

is also determined for SL PRS transmissions corresponding to the same sidelink grant where j=1, 2, . . . , $C_{reset}-1$, $P_{rsvp\_TX}$, if provided, is converted from units of msec to units of logical slots, resulting in $P'_{rsvp\_TX}$ according to clause 8.1.7, and $$(t_0'^{SL}, t_1'^{SL}, t_2'^{SL}, \ldots)$$

is determined by Clause 8. Here, $P_{rsvp\_TX}$ is the resource reservation interval indicated by higher layers.

8.3 UE Procedure for Receiving the Physical Sidelink Shared Channel

For sidelink resource allocation mode 1, a UE upon detection of SCI format 1-A on PSCCH can decode PSSCH according to the detected SCI formats 2-A, 2-B and 2-C, and associated PSSCH resource configuration configured by higher layers. The UE is not required to decode more than one PSCCH at each PSCCH resource candidate.

For sidelink resource allocation mode 2, a UE upon detection of SCI format 1-A on PSCCH can decode PSSCH according to the detected SCI formats 2-A, 2-B and 2-C, and associated PSSCH resource configuration configured by higher layers. The UE is not required to decode more than one PSCCH at each PSCCH resource candidate.

A UE is required to decode neither the corresponding SCI formats 2-A, 2-B and 2-C nor the PSSCH associated with an SCI format 1-A if the SCI format 1-A indicates an MCS table that the UE does not support.

8.4 UE Procedure for Receiving Reference Signals 8.4.4 SL PRS Reception Procedure The UE may be configured, via [higher layer parameter(s)], to measure and report one or more of the SL RSTD, SL Rx-Tx time difference, SL RTOA, SL AoA, SL PRS-RSRP, and SL PRS-RSRPP measurements, for the first detected path and/or additional detected paths. The UE may report an ARP ID associated with the reported measurements. The UE may provide the ARP location information of the ARP ID via [higher layer parameter(s)].

The UE uses the same ARP for both the transmission and reception of sidelink positioning reference signals while performing an SL Rx-Tx time difference measurement.

The UE may include SL PRS resource ID(s) when it reports one or more of the SL RSTD, SL Rx-Tx time difference, SL RTOA, SL AoA, SL PRS-RSRP, and SL PRS-RSRPP measurements.

For the SL RSTD, SL Rx-Tx time difference, SL RTOA, SL AoA, SL PRS-RSRP, and SL PRS-RSRPP measurements, the UE reports an associated SL PRS reception timestamp via higher layer parameter [sl-prs-time-stamp]. For SL Rx-Tx time difference, the UE may report an associated SL PRS transmission timestamp via higher layer parameter [sl-prs-time-stamp]. The timestamp includes the SFN, slot number, and optionally nr-PhysCellID, nr-ARFCN, nr-CellGlobalID, or the timestamp includes DFN and slot number.

The UE may report, LoS/NLoS indicator(s) via [nr-los-nlos-Indicator]associated with each SL RSTD, SL Rx-Tx time difference, SL RTOA, SL AoA, SL PRS-RSRP, and SL PRS-RSRPP measurements.

The UE may report synchronization information synchronization source type and/or relative time difference with the associated quality metric, via [higher layer parameter(s)]. For the SL RSTD measurement, the UE may report a reference UE information.

For SL RTOA measurement, SFN or DFN initialization time may be provided to the UE by a UE or the network.

The UE may be provided with the location information of other UEs via [higher layer parameter]. The UE may report the location information of the UE to the network.

The UE may be provided with expected SL AoA and uncertainty range of the expected SL AoA via [higher layer parameter].

The UE may report quality metric [time quality] corresponding to the SL RSTD, SL RTOA or SL Rx-Tx time difference measurements. The UE may report quality metric [angle quality] corresponding to the SL AoA measurement.[If the '[SL PRS request]' field in the SCI associated with the received SL PRS is set to 1 then the UE shall report this request for SL PRS transmission to higher layers.]

8.5 UE Procedure for Reporting Channel State Information (CSI)

8.5.1 Channel State Information Framework

CSI consists of Channel Quality Indicator (CQI) and Rank Indicator (RI). The CQI and RI are always reported together.

8.5.1.1 Reporting Configurations

The UE shall calculate CSI parameters (if reported) assuming the following dependencies between CSI parameters (if reported)

CQI shall be calculated conditioned on the reported RI

The CSI reporting can be aperiodic (using [10, TS 38.321]). Table 8.5.1.1-1 shows the supported combinations of CSI reporting configurations and CSI-RS configurations and how the CSI reporting is triggered for CSI-RS configuration. Aperiodic CSI-RS is configured and triggered/activated as described in Clause 8.5.1.2.

TABLE 8.5.1.1-1

Triggering/Activation of CSI reporting for the possible CSI-RS Configurations.

| CSI-RS Configuration | Aperiodic CSI Reporting |
| --- | --- |
| Aperiodic CSI-RS | Triggered by SCI. |

For CSI reporting, wideband CQI reporting is supported. A wideband CQI is reported for a single codeword for the entire CSI reporting band.

In TS 38.212 ([3]3GPP TS 38.212 V18.0.0 (2023-09)), SL related control information is specified.

8.3 Sidelink Control Information on PSCCH

SCI carried on PSCCH is a $1^{st}$-stage SCI, which transports sidelink scheduling information.

8.3.1 $1^{st}$-Stage SCI Formats 8.3.1.1 SCI Format 1-A

SCI format 1-A is used for the scheduling of PSSCH and $2^{nd}$-stage-SCI on PSSCH The following information is transmitted by means of the SCI format 1-A:

- Priority—3 bits as specified in clause 5.4.3.3 of [12, TS 23.287] and clause 5.22.1.3.1 of [8, TS 38.321]. Value '000' of Priority field corresponds to priority value '1', value '001' of Priority field corresponds to priority value '2', and so on.
- Frequency resource assignment—number of bits determined by the following:
- Time resource assignment—5 bits when the value of the higher layer parameter sl-MaxNumPerReserve is configured to 2; otherwise 9 bits when the value of the higher layer parameter sl-MaxNumPerReserve is configured to 3, as defined in clause 8.1.5 of [6, TS 38.214].
- Resource reservation period—$\lceil \log_2 N_{rsv\_period} \rceil$ bits as defined in clause 16.4 of [5, TS 38.213], where $N_{rsv\_period}$ is the number of entries in the higher layer parameter sl-ResourceReservePeriodlist, if higher layer parameter sl-MultiReserveResource is configured; 0 bit otherwise.
- DMRS pattern—$\lceil \log_2 N_{pattern} \rceil$ bits as defined in clause 8.4.1.1.2 of [4, TS 38.211], where $N_{pattern}$ is the number of DMRS patterns configured by higher layer parameter sl-PSSCH-DMRS-TimePatternList.
- $2^{nd}$-stage SCI format—2 bits as defined in Table 8.3.1.1-1.
- Beta_offset indicator—2 bits as provided by higher layer parameter sl-BetaOfsets2ndSCI and Table 8.3.1.1-2.
- Number of DMRS port—1 bit as defined in Table 8.3.1.1-3.
- Modulation and coding scheme—5 bits as defined in clause 8.1.3 of [6, TS 38.214].
- Additional MCS table indicator—as defined in clause 8.1.3.1 of [6, TS 38.214]: 1 bit if one MCS table is configured by higher layer parameter sl-Additional-MCS-Table; 2 bits if two MCS tables are configured by higher layer parameter sl-Additional-MCS-Table; 0 bit otherwise.
- PSFCH overhead indication—1 bit as defined clause 8.1.3.2 of [6, TS 38.214] if higher layer parameter sl-PSFCH-Period=2 or 4; 0 bit otherwise.
- Reserved–a number of bits as determined by the following:
  - $N_{reserved}$ bits as configured by higher layer parameter sl-NumReservedBits, with value set to zero, if higher layer parameter sl-IndicationUE-B is not configured, or if higher layer parameter sl-IndicationUE-B is configured to 'disabled';
  - ($N_{reserved}$–1) bits otherwise, with value set to zero.
- Conflict information receiver flag—0 or 1 bit
  - 1 bit if higher layer parameter sl-IndicationUE-B is configured to 'enabled', where the bit value of 0 indicates that the UE cannot be a UE to receive conflict information and the bit value of 1 indicates that the UE can be a UE to receive conflict information as defined in Clause 16.3.0 of [5, TS 38.213];
  - 0 bit otherwise.

TABLE 8.3.1.1-1

$2^{nd}$-stage SCI formats

| Value of 2nd-stage SCI format field | 2nd-stage SCI format |
| --- | --- |
| 00 | SCI format 2-A |
| 01 | SCI format 2-B |
| 10 | SCI format 2-C |
| 11 | SCI format 2-D |

8.3.1.2 SCI Format 1-B

SCI format 1-B is used for the scheduling of SL PRS for a dedicated resource pool.

The following information is transmitted by means of the SCI format 1-B:

- Priority—3 bits as specified in clause x.x of [12, TS 23.586] and clause x.x of [8, TS 38.321]. Value '000' of Priority field corresponds to priority value '1', value '001' of Priority field corresponds to priority value 2, and so on.
- Source ID—12 or 24 bits determined by higher layer parameter XYZ, as defined in clause x.x of [6, TS 38.214].

Destination ID—24 bits as defined in clause x.x of [6, TS 38.214].

Cast type indicator—2 bits as defined in Table 8.3.1.2-1 and in clause x.x of [6, TS 38.214].

Resource reservation period—$\lceil \log_2 N_{rsv\_period} \rceil$ bits as defined in clause xx of [5, TS 38.213], where $N_{rsv\_period}$ is the number of entries in the higher layer parameter reservationPeriodAllowed-Dedicated-SL-PRS-RP, if higher layer parameter reservationPeriodAllowed-Dedicated-SL-PRS-RP is configured; 0 bit otherwise.

Time resource assignment—5 bits when the value of the higher layer parameter sl-MaxNumPerReserveSL-PRS is configured to 2; otherwise 9 bits when the value of the higher layer parameter sl-MaxNumPerReserveSL-PRS is configured to 3. as defined in clause x.x.x of [6, TS 38.214].

Resource ID indication—$\lceil \log_2 N_{SL\text{-}PRS} \rceil$ bits when the value of the higher layer parameter sl-MaxNumPerReserveSL-PRS is configured to 2; otherwise x bits when the value of the higher layer parameter sl-MaxNumPerReserveSL-PRS is configured to 3. The value $N_{SL\text{-}PRS}$ is the total number of SL PRS resources within a slot in a dedicated resource pool for SL PRS transmission and provided by the higher layer parameter XYZ.

SL PRS request—1 bit as defined in clause x.x of [TS 38.214] when the higher layer parameter XYZ is provided; 0 bit otherwise.

Reserved—$N_{reserved}$ bits as configured by higher layer parameter XYZ, with value set to zero.

TABLE 8.3.1.2-1

| Cast type indicator | |
|---|---|
| Value of Cast type indicator | Cast type |
| 00 | Broadcast |
| 01 | Groupcast |
| 10 | Unicast |
| 11 | Reserved |

8.4 Sidelink Control Information on PSSCH

SCI carried on PSSCH is a $2^{nd}$-stage SCI, which transports sidelink scheduling information, and/or inter-UE coordination related information.

8.4.1 $2^{nd}$-Stage SCI Formats 8.4.1.1 SCI Format 2-A

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits.

New data indicator—1 bit.

Redundancy version—2 bits as defined in Table 7.3.1.1.1-2.

Source ID—8 bits as defined in clause 8.1 of [6, TS 38.214].

Destination ID—16 bits as defined in clause 8.1 of [6, TS 38.214].

HARQ feedback enabled/disabled indicator—1 bit as defined in clause 16.3 of [5, TS 38.213].

Cast type indicator—2 bits as defined in Table 8.4.1.1-1 and in clause 8.1 of [6, TS 38.214].

CSI request—1 bit as defined in clause 8.2.1 of [6, TS 38.214] and in clause 8.1 of [6, TS 38.214].

TABLE 8.4.1.1-1

| Cast type indicator | |
|---|---|
| Value of Cast type indicator | Cast type |
| 00 | Broadcast |
| 01 | Groupcast when HARQ-ACK information includes ACK or NACK |
| 10 | Unicast |
| 11 | Groupcast when HARQ-ACK information includes only NACK |

8.4.1.2 SCI Format 2-B

SCI format 2-B is used for the decoding of PSSCH, with HARQ operation when HARQ-ACK information includes only NACK, or when there is no feedback of HARQ-ACK information.

The following information is transmitted by means of the SCI format 2-B:

HARQ process number—4 bits.

New data indicator—1 bit.

Redundancy version—2 bits as defined in Table 7.3.1.1.1-2.

Source ID—8 bits as defined in clause 8.1 of [6, TS 38.214].

Destination ID—16 bits as defined in clause 8.1 of [6, TS 38.214].

HARQ feedback enabled/disabled indicator—1 bit as defined in clause 16.3 of [5, TS 38.213].

Zone ID—12 bits as defined in clause 5.8.11 of [9, TS 38.331].

Communication range requirement—4 bits determined by higher layer parameter sl-ZoneConfigMCR-Index.

8.4.1.3 SCI Format 2-C

SCI format 2-C is used for the decoding of PSSCH, and providing inter-UE coordination information or requesting inter-UE coordination information. SCI format 2-C can be used only for unicast.

The following information is transmitted by means of the SCI format 2-C:

HARQ process number—4 bits

New data indicator—1 bit

Redundancy version—2 bits as defined in Table 7.3.1.1.1-2

Source ID—8 bits as defined in clause 8.1 of [6, TS 38.214]

Destination ID—16 bits as defined in clause 8.1 of [6, TS 38.214]

HARQ feedback enabled/disabled indicator—1 bit as defined in clause 16.3 of [5, TS 38.213]

CSI request—1 bit as defined in clause 8.2.1 of [6, TS 38.214] and in clause 8.1 of [6, TS 38.214]

Providing/Requesting indicator—1 bit, where value 0 indicates SCI format 2-C is used for providing inter-UE coordination information and value 1 indicates SCI format 2-C is used for requesting inter-UE coordination information If the 'Providing/Requesting indicator' field is set to 0, all the remaining fields are set as follows:

Resource combinations –

$$2\cdot\left(\left\lceil\log_2\left(\frac{N^{SL}_{subChannel}(N^{SL}_{subChannel}+1)(2N^{SL}_{subChannel}+1)}{6}\right)\right\rceil+9+Y\right)$$

bits as defined in Clause 8.1.5A of [6, TS 38.214], where $Y=\lceil\log_2 N_{rsv\_period}\rceil$ and $N_{rsv\_period}$ is the number of entries in the higher layer parameter sl-ResourceReservePeriodList, if higher layer parameter sl-MultiReserveResource is configured; Y=0 otherwise $$N^{SL}_{subChannel}$$

is the number of subchannels in a resource pool provided by the higher layer parameter sl-NumSubchannel First resource location—8 bits as defined in Clause 8.1.5A of [6, TS 38.214].

Reference slot location—$(10+\lceil\log_2(10\cdot2^{\mu})\rceil)$ bits as defined in Clause 8.1.5A of [6, TS 38.214], where μ is defined in Table 4.2-1 of Clause 4.2 of [4, TS 38.211].

Resource set type—1 bit, where value 0 indicates preferred resource set and value 1 indicates non-preferred resource set.

Lowest subChannel indices—

$$2\cdot\lceil\log_2 N^{SL}_{subChannel}\rceil$$

bits as defined in Clause 8.1.5A of [6, TS 38.214].

If the 'Providing/Requesting indicator' field is set to 1, all the remaining fields are set as follows:

Priority—3 bits as specified in clause 5.4.3.3 of [12, TS 23.287] and clause 5.22.1.3.1 of [8, TS 38.321]. Value '000' of Priority field corresponds to priority value '1', value '001' of Priority field corresponds to priority value '2', and so on.

Number of subchannels—

$$\lceil\log_2 N^{SL}_{subChannel}\rceil$$

bits as defined in Clause 8.1.4A of [6, TS 38.214].

Resource reservation period—$\lceil\log_2 N_{rsv\_period}\rceil$ bits as defined in Clause 8.1.4A of [6, TS 38.214], where $N_{rsv\_period}$ is the number of entries in the higher layer parameter sl-ResourceReservePeriodList, if higher layer parameter sl-MultiReserveResource is configured; 0 bit otherwise.

Resource selection window location—$2\cdot(10+\lceil\log_2(10\cdot2^{\mu})\rceil)$ bits as defined in Clause 8.1.4A of [6, TS 38.214], where p is defined in Table 4.2-1 of Clause 4.2 of [4, TS 38.211].

Resource set type—1 bit, where value 0 indicates a request for inter-UE coordination information providing preferred resource set and value 1 indicates a request for inter-UE coordination information providing non-preferred resource set, if higher layer parameter sl-DetermineResourceType is configured to 'ueb'; otherwise, 0 bit.

Padding bits.

For operation in a same resource pool, zeros shall be appended to SCI format 2-C of which 'Providing/Requesting indicator' field is set to 1 until the payload size equals that of SCI format 2-C of which 'Providing/Requesting indicator' field is set to 0.

8.4.1.4 SCI Format 2-D

SCI format 2-D is used for the decoding of PSSCH and the scheduling of SL PRS for a shared resource pool.

The following information is transmitted by means of the SCI format 2-D:

SL PRS resource ID—$\lceil\log_2 N_{SL\text{-}PRS}\rceil$ bits, where the value $N_{SL\text{-}PRS}$ is the total number of SL PRS resource IDs within a slot in a shared resource pool for SL PRS transmission and provided by the higher layer parameter XYZ.

SL PRS request—1 bit as defined in clause x.x of [6, TS 38.214] when the higher layer parameter XYZ is provided; 0 bit otherwise.

Embedded SCI format—2 bits. This field indicates the embedded SCI format as defined in Table 8.4.1.4-1.

Embedded SCI format payload—number of bits determined according to Table 8.4.1.4-1. This field is set to the associated payload of the embedded SCI format indicated by the 'Embedded SCI format' field as defined in Table 8.4.1.4-1.

TABLE 8.4.1.4-1

Embedded SCI format and payload

| Value of the Embedded SCI format field | Embedded SCI format | Embedded SCI format payload |
|---|---|---|
| 00 | SCI format 2-A | Set to all fields included in SCI format 2-A |
| 01 | SCI format 2-B | Set to all fields included in SCI format 2-B |
| 10 | Reserved | Reserved |
| 11 | Reserved | Reserved |

8.4.4 Rate Matching

For $2^{nd}$-stage SCI transmission on PSSCH with SL-SCH, the number of coded modulation symbols generated for $2^{nd}$-stage SCI transmission prior to duplication for the 2nd layer if present, denoted as $$Q'_{SCI2},$$

is determined as follows:

8.4.5 Multiplexing of Coded $2^{nd}$-Stage SCI Bits to PSSCH

The coded $2^{nd}$-stage SCI bits are multiplexed onto PSSCH according to the procedures in Clause 8.2.1.

In Draft CR for TS 38.321 ([5]R2-2312264), SL-PRS related standard change in MAC layer is specified.

3.1 Definitions

For the purposes of the present document, the terms and definitions given in TR 21.905 [1] and the following apply. A term defined in the present document takes precedence over the definition of the same term, if any, in TR 21.905 [1].

Ranging/Sidelink Positioning: AS Functionality Enabling Ranging-Based Services and Sidelink Positioning as in TS 23.586 [xx].

Serving Cell: A PCell, a PSCell, or an SCell in TS 38.331 [5].

Sidelink transmission Information: Sidelink transmission information included in an SCI for an SL-SCH transmission or SL-PRS transmission with or without SL-SCH transmission on SL-PRS shared resource pool as specified in clause 8.3 and 8.4 of TS 38.212 [9] consists of Sidelink HARQ information including NDI, RV, Sidelink process ID, HARQ feedback enabled/disabled indicator, Sidelink identification information including cast type indicator, Source Layer-1 ID and Destination Layer-1 ID, and Sidelink other information including CSI request SL-PRS request. SL-PRS resource ID, a priority, a communication range requirement and Zone ID.

SL-PRS dedicated resource pool: A sidelink resource pool which can be used for transmission of SL-PRS and cannot be used for transmission of PSSCH.

SL-PRS shared resource pool: A sidelink resource pool which can be used for transmission of both SL-PRS and PSSCH.

SL-PRS transmission Information on SL-PRS dedicated resource pool: SL-PRS transmission information on SL-PRS dedicated resource pool is included in an SCI for an SL-PRS transmission on SL-PRS dedicated resource pool. as specified in TS 38.212 191. consisting of SL-PRS identification information. including cast type indicator. source ID and destination ID;

SL-PRS transmission other information. including SL-PRS priority. SL-PRS request. SL-PRS resource ID and resource reservation period.

5.22 SL-SCH Data Transfer and SL-PRS Transmission 5.22.1 SL-SCH Data and SL-PRS Transmission 5.22.1.1 SL Grant Reception and SCI Transmission Sidelink grant is received dynamically on the PDCCH, configured semi-persistently by RRC or autonomously selected by the MAC entity. The MAC entity may have a sidelink grant on an active SL BWP to determine a set of PSCCH duration(s) in which transmission of SCI occurs and a set of PSSCH duration(s) in which transmission of SL-SCH associated with the SCI occurs. The MAC entity may have a sidelink grant on the SL-PRS shared resource pool of an active BWP to determine a set of PSCCH durations(s) in which transmission of SCI occurs and a set of SL-PRS transmission occasion(s) and PSSCH duration(s) in which transmission of SL-PRS and SL-SCH associated with the SCI occur. The MAC entity may have a sidelink grant on the SL-PRS dedicated resource pool of an active BWP to determine a set of PSCCH duration(s) in which transmission of SCI occurs and a set of SL-PRS transmission occasion(s) in which transmission of SL-PRS associated to the SCI occurs. A sidelink grant addressed to SLCS-RNTI with NDI=1 is considered as a dynamic sidelink grant. A sidelink grant addressed to SL-PRS-CS-RNTI with Activation/Release indication=1 as in clause 7.3.1.4.3 in TS 38.212 [9]is considered as a dynamic sidelink grant.If the MAC entity has been configured with Sidelink resource allocation mode 1 or if the MAC entity has been configured with resource allocation Scheme 1 and the PDCCH is received for resource allocation in SL-PRS shared resource pool as indicated in TS 38.331 [5], the MAC entity shall for each PDCCH occasion and for each grant received for this PDCCH occasion:

- 1> if a sidelink grant has been received on the PDCCH for the MAC entity's SL-RNTI:
  - 2> if the NDI received on the PDCCH has not been toggled compared to the value in the previously received HARQ information for the HARQ Process ID;
    - 3> use the received sidelink grant to determine PSCCH duration(s) and PSSCH duration(s) and SL-PRS transmission occasion(s). if available. for one or more retransmissions of a single MAC PDU for the corresponding Sidelink process according to clause 8.1.2 of TS 38.214 [7] and SL-PRS according to clause 8.1.4 of TS 38.214 [7];
  - 2> else:
    - 3> use the received sidelink grant to determine PSCCH duration(s) and PSSCH duration(s) and SL-PRS transmission occasion(s). if available, for initial transmission and, if available, retransmission(s) of a single MAC PDU and SL-PRS according to clause 8.1.2 of TS 38.214 [7];

NOTE: When SL-PRS is transmitted on SL-PRS shared resource pool. the PSSCH duration(s) and SL-PRS transmission occasion(s) are determined only after the LCP procedure in clause 5.22.1.4.1.

- 1> else if a sidelink grant has been received on the PDCCH for the MAC entity's SLCS-RNTI:
  - 2> if PDCCH contents indicate retransmission(s) for the identified HARQ process ID that has been set for an activated configured sidelink grant identified by sl-ConfiglndexCG;
    - 3> use the received sidelink grant to determine PSCCH duration(s) and PSSCH duration(s) and SL-PRS transmission occasion(s), if available, for one or more retransmissions of a single MAC PDU and SL-PRS according to clause 8.1.2 of TS 38.214 [7].
  - 2> else if PDCCH contents indicate configured grant Type 2 deactivation for a configured sidelink grant:
    - 3> trigger configured sidelink grant confirmation for the configured sidelink grant.
  - 2> else if PDCCH contents indicate configured grant Type 2 activation for a configured sidelink grant:
    - 3> trigger configured sidelink grant confirmation for the configured sidelink grant;
    - 3> store the configured sidelink grant;
    - 3> initialise or re-initialise the configured sidelink grant to determine the set of PSCCH durations and the set of PSSCH durations for transmissions of multiple MAC PDUs according to clause 8.1.2 of TS 38.214 [7] and the set of SL-PRS transmission occasions for transmission of multiple SL-PRS according to clause of 8.2.4 of TS 38.214 [7], if available.
- 1> if a dynamic sidelink grant is available for retransmission(s) of a MAC PDU which has been positively acknowledged as specified in clause 5.22.1.3.1a:
  - 2> clear the PSCCH duration(s) and PSSCH duration (s) corresponding to retransmission(s) of the MAC PDU from the sidelink grant.

Editor's NOTE: FFS SL-PRS transmission on SL-PRS shared resource pool when the MAC PDU has been positively acked for resource allocation scheme 1.

If the MAC entity has been configured with Sidelink resource allocation scheme 1 and PDCCH is received for resource allocation on SL-PRS dedicated resource pool as in TS 38.331 [5], the MAC entity shall for each PDCCH occasion:

- 1> if a sidelink grant has been received on the PDCCH for the MAC entity's SL-PRS-RNTI: (i.e.. for dynamic grant)

2> use the received sidelink grant to determine the PSCCH duration(s) and the corresponding SL-PRS occasion(s) for the transmission or retransmission of SL-PRS.

1> else if a sidelink grant has been received on the PDCCH for MAC entity's SL-PRS-CS-RNTI: (i.e.. configured sidelink grant type 2)

2> if PDCCH contents indicate retransmission(s) for the SL-PRS transmission:

3> use the received sidelink grant to determine PSCCH duration(s) and SL-PRS transmission occasions for one or more retransmissions for a SL-PRS as in clause 8.2.4 of TS 38.214 [7].

2> else if the PDCCH content indicates the configured grant Type 2 activation for a configured sidelink grant:

3> store the configured sidelink grant:

3> trigger configured grant confirmation for the configured sidelink grant:

3> initialize or re-initialize the configured sidelink grant to determine the set of PSCCH duration(s) and the corresponding SL-PRS occasion for the transmission of SL-PRS.

2> else if the PDCCH content indicates the configured Type 2 deactivation for a configured sidelink grant:

3> trigger configured grant confirmation for the configured sidelink grant.

If the MAC entity has been configured with Sidelink resource allocation mode 2 to transmit or resource allocation Scheme 2 to transmit using pool(s) of resources in a carrier as indicated in TS 38.331 [5] or TS 36.331 [21] based on full sensing, or partial sensing, or random selection or any combination(s), the MAC entity shall for each Sidelink process and SL-PRS transmission:

NOTE 0: For SL-PRS transmission by resource allocation Scheme 2 on SL-PRS dedicated resource pool, partial sensing is not supported.

NOTE 1: If the MAC entity is configured with Sidelink resource allocation mode 2 or resource allocation Scheme 2 to transmit using a pool of resources in a carrier as indicated in TS 38.331 [5] or TS 36.331 [21], the MAC entity can create a selected sidelink grant on the pool of resources based on random selection, or partial sensing, or full sensing only after releasing configured sidelink grant(s), if any.

NOTE 2: The MAC entity expects that PSFCH is always configured by RRC for at least one pool of resources in sl-TxPoolSelectedNormal and for the resource pool in sl-TxPoolExceptional in case that at least a logical channel configured with sl-HARQ-FeedbackEnabled is set to enabled.

NOTE 2A: For the transmission of Sidelink Inter-UE Coordination Request MAC CE, the MAC entity selects the TX pool of resource where the IUC resource set is required. For the transmission of Sidelink Inter-UE Coordination Information MAC CE, the MAC entity selects the TX pool of resource where the IUC resource set is located.

The MAC entity shall for each PSCCH duration on SL-PRS dedicated resource pool:

1> if the MAC entity is not configured with multiple SL-PRS transmissions with resource allocation Scheme 2: or 1> if the MAC entity is configured with resource allocation Scheme 1:

2> set the resource reservation period to 0.

1> else if the MAC entity is configured with multiple SL-PRS transmission with resource allocation Scheme 2:

2> set the resource reservation period to the selected value.

Editor's NOTE: FFS whether SL-PRS priority is determined by priority in the peer UE's UCI or the UE's own higher layer when the trigger comes from the peer UE's SCI.

Editor's NOTE: FFS how SL-PRS priority is determined when SL-PRS is triagered by the UE's own higher layer.

For configured sidelink grants not on SL-PRS dedicated resource pool, the HARQ Process ID associated with the first slot of an SL transmission is derived from the following equation:

$$HARQ\text{ Process } ID = [\text{floor}(\text{CURRENT\_slot}/\text{Periodicity}SL)] \text{ modulo } sl\text{-}NrOfHARQ\text{-Processes} + sl\text{-}HARQ\text{-}ProcID\text{-offset}$$

where CURRENT_slot refers to current logical slot in the associated resource pool, and PeriodicihySL is defined in clause 5.8.3.

5.22.1.3 Sidelink HARQ Operation and SL-PRS Transmission on SL-PRS Shared Resource Pool 5.22.1.3.1 Sidelink HARQ Entity The MAC entity includes at most one Sidelink HARQ entity for transmission on SL-SCH, which maintains a number of parallel Sidelink processes.

The maximum number of transmitting Sidelink processes associated with the Sidelink HARQ Entity is 16. A sidelink process may be configured for transmissions of multiple MAC PDUs. For transmissions of multiple MAC PDUs with Sidelink resource allocation mode 2, the maximum number of transmitting Sidelink processes associated with the Sidelink HARQ Entity is 4.

Editors NOTE: FFS the maximum number of SL processes that allow the SL-PRS transmission.

A delivered sidelink grant and its associated Sidelink transmission information are associated with a Sidelink process. Each Sidelink process supports one TB.

For each sidelink grant that is not on SL-PRS dedicated resource pool, the Sidelink HARQ Entity shall:

1> if the MAC entity determines that the sidelink grant is used for initial transmission as specified in clause 5.22.1.1; or 1> if the sidelink grant is a configured sidelink grant and no MAC PDU has been obtained in an sl-PeriodCG of the configured sidelink grant; or 1> if the sidelink grant is a dynamic sidelink grant or selected sidelink grant and no MAC PDU has been obtained in the previous sidelink grant when PSCCH duration(s) and $2^{nd}$ stage SCI on PSSCH of the previous sidelink grant is not in SL DRX Active time as specified in clause 5.28.3 of any destination that has data to be sent;

NOTE 1: Void.

2> (re-)associate a Sidelink process to this grant, and for the associated Sidelink process;

2> if all PSCCH duration(s) and PSSCH duration(s) for initial transmission of a MAC PDU of the dynamic sidelink grant or the configured sidelink grant is not in SL DRX Active time as specified in clause 5.28.3 of the destination that has data to be sent:

3> ignore the sidelink grant.

NOTE 1A: The Sidelink HARQ Entity will associate the selected sidelink grant to the Sidelink process determined by the MAC entity.

2> else:

3> obtain the MAC PDU to transmit from the Multiplexing and assembly entity, if any;

3> if a MAC PDU to transmit has been obtained:

4> if a HARQ Process ID has been set for the sidelink grant:

5> (re-)associate the HARQ Process ID corresponding to the sidelink grant to the Sidelink process.

NOTE 1a: There is one-to-one mapping between a HARQ Process ID and a Sidelink process in the MAC entity configured with Sidelink resource allocation mode 1.

4> determines Sidelink transmission information of the TB for the source and destination pair of the MAC PDU as follows:

5> set the Source Layer-1 ID to the 8 LSB of the Source Layer-2 ID of the MAC PDU;

5> set the Destination Layer-1 ID to the 16 LSB of the Destination Layer-2 ID of the MAC PDU;

5> (re-)associate the Sidelink process to a Sidelink process ID;

NOTE 1b : How UE determine Sidelink process ID in SCI is left to UE implementation for NR sidelink.

5> consider the NDI to have been toggled compared to the value of the previous transmission corresponding to the Sidelink identification information and the Sidelink process ID of the MAC PDU and set the NDI to the toggled value;

NOTE 2: The initial value of the NDI set to the very first transmission for the associated Sidelink process is left to UE implementation.

NOTE 3: Void.

5> if the MAC PDU is for NR sidelink discovery:

6> set the cast type indicator to broadcast.

5> else:

6> set the cast type indicator to one of broadcast, groupcast and unicast as indicated by upper layers.

Editors NOTE: The cast tvoe indicator is determined as a result of the logical channel prioritization as in section 5.22.1.4 and should not be indicated by upper layer. There might be an issue with the legacy sidelink communication spec and FFS how this can be resolved.

5> if HARQ feedback has been enabled for the MAC PDU according to clause 5.22.1.4.2;

6> set the HARQ feedback enabled/disabled indicator to enabled.

5> else:

6> set the HARQ feedback enabled/disabled indicator to disabled.

5> set the priority to the value of the highest priority of the logical channel(s), if any, and MAC CE(s), if included, in the MAC PDU and SL-PRS. if any;

NOTE 3A:

5> if HARQ feedback is enabled for groupcast:

6> if both a group size and a member ID are provided by upper layers and the group size is not greater than the number of candidate PSFCH resources associated with this sidelink grant:

7> select either positive-negative acknowledgement or negative-only acknowledgement.

NOTE 4: Selection of positive-negative acknowledgement or negative-only acknowledgement is up to UE implementation.

6> else:

7> select negative-only acknowledgement.

6> if negative-only acknowledgement is selected, UE's location information is available, and sl-TransRange has been configured for a logical channel in the MAC PDU, and sl-ZoneConfig is configured as specified in TS 38.331 [5]:

7> set the communication range requirement to the value of the longest communication range of the logical channel(s) in the MAC PDU;

7> determine the value of sl-ZoneLength corresponding to the communication range requirement and set Zone_id to the value of Zone_id calculated using the determined value of sl-ZoneLength as specified in TS 38.331 [5].

5> set the Redundancy version to the selected value.

5> if the sidelink grant is associated with request from the higher layer for triggering the SL-PRS transmission of the peer UE identified by the Destination layer-2 ID:

6> set the SL-PRS request to request.

5> set the SL-PRS resource ID to [the value of the field], if available, within Sidelink transmission information.

Editor's NOTE: FFS how the SL-PRS resource ID is determined and its impacts to MAC.

4> deliver the MAC PDU, SL-PRS, if available, the sidelink grant and the Sidelink transmission information of the TB to the associated Sidelink process;

4> instruct the associated Sidelink process to trigger a new transmission.

3> else;

4> flush the HARQ buffer of the associated Sidelink process.

1> else (i.e. retransmission):

2> if the HARQ Process ID corresponding to the sidelink grant received on PDCCH, the configured sidelink grant or the selected sidelink grant is associated to a Sidelink process of which HARQ buffer is empty; or 2> if the HARQ Process ID corresponding to the sidelink grant received on PDCCH is not associated to any Sidelink process; or 2> if PSCCH duration(s) and PSSCH duration(s) for one or more retransmissions of a MAC PDU of the dynamic sidelink grant or the configured sidelink grant is not in SL DRX Active time as specified in clause 5.28.3 of the destination that has data to be sent:

3> ignore the sidelink grant.

2> else:

3> identify the Sidelink process associated with this grant, and for the associated Sidelink process:

4> deliver the sidelink grant of the MAC PDU and the SL-PRS, if available, to the associated Sidelink process;

4> instruct the associated Sidelink process to trigger a retransmission.

5.22.1.3.1a Sidelink Process

The Sidelink process is associated with a HARQ buffer.

New transmissions and retransmissions are performed on the resource indicated in the sidelink grant as specified in clause 5.22.1.1 and with the MCS selected as specified in clause 8.1.3.1 of TS 38.214 [7] and clause 5.22.1.1.

If the Sidelink process is configured to perform transmissions of multiple MAC PDUs with Sidelink resource allocation mode 2, the process maintains a counter SL_RESOURCE_RESELECTION_COUNTER. For other configurations of the Sidelink process, this counter is not available.

Priority of a MAC PDU is determined by the highest priority of the logical channel(s) or MAC CE(s) in the MAC PDU.

If the Sidelink HARQ Entity requests a new transmission, the Sidelink process shall:

1> store the MAC PDU in the associated HARQ buffer;

1> store the sidelink grant received from the Sidelink HARQ Entity;

1> generate a transmission as described below.

If the Sidelink HARQ Entity requests a retransmission, the Sidelink process shall:

1> store the sidelink grant received from the Sidelink HARQ Entity;

1> generate a transmission as described below.

5.22.1.4.1 Logical Channel Prioritization 5.22.1.4.1.1 General

The sidelink Logical Channel Prioritization procedure is applied whenever a new transmission is performed.

. . . 5.22.1.4.1.2 Selection of Logical Channels and SL-PRS

The MAC entity shall for each SCI corresponding to a new transmission:

1> if sl-BWP-DiscPoolConfig or sl-BWP-DiscPoolConfigCommon is configured according to TS 38.331 [5], and;

1> if the new transmission is not associated to a sidelink grant on SL-PRS dedicated resource pool:

2> if the new transmission is associated to a sidelink grant in sl-DiscTxPoolSelected or sl-DiscTxPoolScheduling configured in sl-BWP-DiscPoolConfig or sl-BWP-DiscPoolConfigCommon:

3> select a Destination associated with NR sidelink discovery as specified in TS 23.304 [26], that is in the SL Active time for the SL transmission occasion if SL DRX is applied for the destination, and among the logical channels that satisfy all the following conditions for the SL grant associated to the SCI:

4> SL data for NR sidelink discovery is available for transmission; and

4> SBj>0, in case there is any logical channel having SBj>0; and

4> sl-configuredGrantType1Allowed, if configured, is set to true in case the SL grant is a Configured Grant Type 1; and 4> sl-AllowedCG-List, if configured, includes the configured grant index associated to the SL grant.

2> else:

3> select a Destination associated to one of unicast, groupcast and broadcast (excluding the Destination(s) associated with NR sidelink discovery as specified in TS 23.304 [26]), that is in the SL Active time for the SL transmission occasion if SL DRX is applied for the destination, and having at least one of the MAC CE and the logical channel and pending SL-PRS transmission(s) with the highest priority, among the logical channels that satisfy all the following conditions, and MAC CE(s), if any, and SL-PRS(s) for the SL grant associated to the SCI:

4> SL data for NR sidelink communication is available for transmission; and

4> SBj>0, in case there is any logical channel having SBj>0; and

4> sl-configuredGrantType1Allowed, if configured, is set to true in case the SL grant is a Configured Grant Type 1; and 4> sl-AllowedCG-List, if configured, includes the configured grant index associated to the SL grant; and 4> sl-HARQ-FeedbackEnabled is set to disabled, if PSFCH is not configured for the SL grant associated to the SCI.

1> else if sl-BWP-DiscPoolConfiq or sl-BWP-DiscPoolConfigCommon is not configured according to TS 38.331 [15], and;

1> if the new transmission is not associated to a sidelink grant on SL-PRS dedicated resource pool:

2> select a Destination associated to one of unicast, groupcast and broadcast, that is in the SL Active time for the SL transmission occasion if SL DRX is applied for the destination, and having at least one of the MAC CE and the logical channel and pending SL-PRS transmission(s) with the highest priority, among the logical channels that satisfy all the following conditions and MAC CE(s), if any, and SL-PRS(s), if any, for the SL grant associated to the SCI:

3> SL data is available for transmission; and

3> SBj>0, in case there is any logical channel having SBj>0; and

3> sl-configuredGrantType1Allowed, if configured, is set to true in case the SL grant is a Configured Grant Type 1; and 3> sl-AllowedCG-List, if configured, includes the configured grant index associated to the SL grant; and 3> sl-HARQ-FeedbackEnabled is set to disabled, if PSFCH is not configured for the SL grant associated to the SCI.

NOTE 1: If multiple Destinations have the logical channels satisfying all conditions above with the same highest priority or if multiple Destinations have either the MAC CE and/or the logical channels satisfying all conditions above with the same priority as the MAC CE, which Destination is selected among them is up to UE implementation.

1> else: (the SL grant is associated is on dedicated SL-PRS resource pool)

2> select a Destination associated to one of unicast, grouncast and broadcast and having pending SL-PRS transmission(s) with the highest priority for the SL grant associated to the SCI.

Editors NOTE: FFS the other criteria for destination selection in SL-PRS shared and dedicated resource pool.

1> select the logical channels satisfying all the following conditions among the logical channels belonging to the selected Destination if the new transmission is not associated to a sidelink grant on SL-PRS dedicated resource pool:

2> SL data is available for transmission; and

2> . . .

NOTE 2: . . .

5.22.1.4.1.3 Allocation of Sidelink Resources

The MAC entity shall for each sidelink grant associated with SL-PRS shared resource pool:

1> if there is SL-PRS pending for transmission for the selected destination; and 2> if all the SL-SCH data within logical channel with lower priority value than that of the SL-PRS can be allocated with resources:

3> determine that the pending SL-PRS can be transmitted in the sidelink grant.

2> derive the Transport Block Size for a new transmission for SL-SCH according to clause 8.1.3.2 in TS 38.214 [7].

Editors NOTE: FFS mechanism for preventing high priority PRS occupving all the resources. Rapp considers it as an optimization but could be further discussed.

Editors NOTE: FFS more detailed orocedure for determining whether PRS is transmitted.

The MAC entity shall for each SCI corresponding to a new transmission for SL-SCH:

1> allocate resources to the logical channels as follows:

2> logical channels selected in clause 5.22.1.4.1.2 for the SL grant with SBj>0 are allocated resources in a decreasing priority order. If the sPBR of a logical channel is set to infiniy, the MAC entity shall allocate resources for all the data that is available for transmission on the logical channel before meeting the sPBR of the lower priority logical channel(s);

2> decrement SBj by the total size of MAC SDUs served to logical channel j above;

2> if any resources remain, all the logical channels selected in clause 5.22.1.4.1.2 are served in a strict decreasing priority order (regardless of the value of SBj) until either the data for that logical channel or the SL grant is exhausted, whichever comes first. Logical channels configured with equal priority should be served equally.

5.22.1.xx SL-PRS Transmission on SL-PRS Dedicated Resource Pool

The MAC entity shall for the SCI of each new transmission of SL-PRS:

1> set the Destination ID to the Destination layer-2 ID corresponding to the SL-PRS transmission;

1> if [12bitSourceID] is configured:

2> set the Source ID to the 12 [most/least signitcant bits] of the Source layer-2 ID corresponding to the SL-PRS transmission:

1> else if [24bitSourceID] is configured:

2> set the Source ID to the Source layer-2 ID corresfonding to the SL-PRS transmission;

1> set the cast type indicator to one of broadcast, groupcast and unicast as selected in clause 5.22.1.2.1.2;

1> set the SL-PRS priority as the value indicated by upper layer;

1> set the SL-PRS resource ID:

Editor's NOTE: FFS how the SL-PRS resource ID is determined and its impacts to transmission on SL-PRS dedicated resource pool.

1> if the higher laver triggers s SL-PRS transmission to the peer UE identified by the Destination layer-2 ID:

2> set the SL-PRS request to request.

Editors NOTE: FFS when source ID length configured as 12 bit, whether it is the MSB or LSB of the source layer-2 ID of the UE.

The MAC entity shall, for each retransmission of SL-PRS, adopt the same SCI fields as the SCI fields for the corresponding new transmission.

For each SL-PRS new transmission or retransmission, the MAC entity shall:

1> if there is no unlink transmission: or

1> if there is uplink transmission and the sidelink transmission is prioritized over unlink transmission:

2> instruct the physical layer to transmit SCI of the SL grant with the associated SL-PRS transmission information on SL-PRS dedicated resource pool;

2> instruct the physical laver to generate the SL-PRS on SL-PRS dedicated resource pool.

1> if this transmission corresponds to the last transmission of the SL-PRS transmission;

2> decrement SL RESOURCE RESELECTION COUNTER by 1, if available.

Editors NOTE: FFS how to maintain the resource reselection counter for resource selection in SL-PRS dedicated resource pool.

The transmission of the SL-PRS is prioritized over uplink transmission(s) of the MAC entity or the other MAC entity if the following conditions are met:

1> if the MAC entity is not able to perform this sidelink transmission simultaneously with all uplink transmission(s) at the time of the transmission, and 1> if [ul-PrioritimationThres] is configured and if the value of the highest priority of logical channel(s) of all the NR uplink transmission(s) is not lower than [ul-PrioritizationThres], and 1> if [sl-PrioritizationThres] is configured and if the value of SL-PRS priority is lower than [sl-Prioritiration-Thres].

Editors NOTE: FFS whether the condition that it is prioritized by higher layer is still needed for SL-PRS prioritized over uplink transmission is.

5.22.1.yy SL-PRS Resource Request

SL-PRS transmission can be triggered either by lower laver signalling from the peer UE or the UE's own higher layer. The SL-PRS resource request procedure is used to provide gNB with information about the SL-PRS that the UE needs to transmit.

The MAC entity shall, if resource allocation Scheme 1 for SL-PRS transmission is configured:

1> if aperiodic SL-PRS is triggered:

2> trigger the SL-PRS resource request.

1> else if periodic SL-PRS is triggered:

2> notify RRC to send SL-PRS resource request.

The MAC entity shall:

1> if SL-PRS resource request is triggered and not cancelled:

2> if UL-SCH resources are available for a new transmission and these UL-SCH resources can accommodate the SL-PRS resource request MAC CE plus its subheader as a result of logical channel prioritization:

3> instruct the Multiplexing and Assembly entity to generate the SL-PRS resource request MAC CE.

2> else:

3> trigger a Scheduling Request for the SL-PRS resource request MAC CE as specified in clause 5.4.4.

The SL-PRS resource request MAC CE shall be cancelled when a MAC PDU is transmitted and this PDU includes a SL-PRS resource request MAC CE.

Editors NOTE: FFS other conditions for the cancellation of the MAC CE.

5.22.2 SL-SCH Data and SL-PRS Reception 5.22.2.1 SCI Reception

SCI can indicate if there is a transmission on SL-SCH and provide the relevant HARQ information. SCI can also indicate if there is a SL-PRS transmission. An SCI for SL-SCH transmission with or without corresponding SL-PRS on SL-PRS shared resource pool consists of two parts: the 1st stage SCI on PSCCH and the 2nd stage SCI on PSSCH as specified in clause 8.1 of TS 38.214 [7]. An SCI for SL-PRS transmission on SL-PRS dedicated resource pool consist of a single part on PSCCH as specified in TS 38.212 [9].

The MAC entity shall:

1> for each PSCCH duration during which the MAC entity monitors PSCCH:
   2> if a 1st stage SCI has been received on the PSCCH:
      3> determine the set of PSSCH durations in which reception of a 2nd stage SCI and the transport block occur using the received part of the SCI;
      3> if the 2nd stage SCI for this PSSCH duration has been received on the PSSCH:
         4> store the SCI as a valid SCI for the PSSCH durations corresponding to transmission(s) of the transport block and SL-PRS, if available, and the associated HARQ information and QoS information;
   2> else if an SCI has been received on the PSCCH reception on SL-PRS dedicated resource pool for SL-PRS transmission:
      3> determine the SL-PRS transmission occasion corresponding to the SCI; corresponding SL-PRS transmission information on SL-PRS dedicated resource pool.
1> for each PSSCH duration for which the MAC entity has a valid SCI:
   2> deliver the SCI and the associated Sidelink transmission information to the Sidelink HARQ Entity.
1> for each SL-PRS transmission occasion for which MAC entity has a valid SCI:
   2> perform SL-PRS reception according to the SL-PRS transmission information within the SCI as in clause 5.22.2.2.2 for SL-PRS received on SL-PRS shared resource pool and as in clause 5.22.2.x for SL-PRS received on SL-PRS dedicated resource pool.

5.22.2.2.2 Sidelink Process

For each PSSCH duration where a transmission takes place for the Sidelink process, one TB and the associated HARQ information is received from the Sidelink HARQ Entity.

For each received TB and SL-PRS, if available, and associated Sidelink transmission information, the Sidelink process shall:

1> if this is a new transmission:
   2> attempt to decode the received data.
1> else if this is a retransmission:
   2> if the data for this TB has not yet been successfully decoded:
      3> instruct the physical layer to combine the received data with the data currently in the soft buffer for this TB and attempt to decode the combined data.
1> if the data which the MAC entity attempted to decode was successfully decoded for this TB; or
1> if the data for this TB was successfully decoded before:
   2> if this is the first successful decoding of the data for this TB:
      3> if this TB is associated to unicast and the DST field of the decoded MAC PDU subheader is equal to the 8 MSB of any of the Source Layer-2 ID(s) of the UE for which the 16 LSB are equal to the Destination ID in the corresponding SCI:
         4> if the SRC field of the decoded MAC PDU subheader is equal to the 16 MSB of any of the Destination Layer-2 ID(s) of the UE for which the 8 LSB are equal to the Source ID in the corresponding SCI; or
         4> if this TB is corresponding to the logical channel with LCID equal to 0 or 1 and determined to be the first TB:
            5> deliver the decoded MAC PDU to the disassembly and demultiplexing entity.
            5> if the sidelink transmission information in the SCI includes fields for SL-PRS reception:
               6> instruct the physical layer to perform SL-PRS reception.
      3> if this TB is associated to groupcast or broadcast:
         4> if the DST field of the decoded MAC PDU subheader is equal to the 8 MSB of any of the Destination Layer-2 ID(s) of the UE for which the 16 LSB are equal to the Destination ID in the corresponding SCI; or
         4> if this TB is corresponding to the logical channel with LCID equal to 58, and the DST field of the decoded MAC PDU subheader is equal to the 8 MSB of any of the Source Layer-2 ID(s) of the UE for which the 16 LSB are equal to the Destination ID in the corresponding SCI:
            5> deliver the decoded MAC PDU to the disassembly and demultiplexing entity.
            5> if the sidelink transmission information in the SCI includes fields for SL-PRS reception:
               6> instruct the physical layer to perform SL-PRS reception.

NOTE: Whether the TB is the first TB can be determined based on the Source Layer-2 ID and Destination Layer-2 ID pair.

2> consider the Sidelink process as unoccupied.
1> else;
   2> instruct the physical layer to replace the data in the soft buffer for this TB with the data which the MAC entity attempted to decode.

Editor's NOTE: FFS how the PFSCH is generated when SL-PRS is transmitted on shared resource pool.

5.22.2.x SL-PRS Reception on SL-PRS Dedicated Resource Pool

For each SL-PRS transmission occasion on SL-PRS dedicated resource pool, the MAC entity shall:

1> if this SL-PRS transmission is associated to unicast:
   2> if the destination ID in the corresponding SCI is equal to the UE's source ID; and
   2> if [12bitSourceID] is configured and source ID in the corresponding SCI is equal to the 12 [most/least significant bits] of the UE's destination ID or if [24bitSourceID] is configured and source ID in the corresponding SCI is equal to the UE's destination ID:
      3> instruct the physical layer to perform SL-PRS reception on the SL-PRS transmission occasion.

1> else if this SL-PRS transmission is associated to broadcast or groupcast:

2> if the destination ID in the corresponding SCI is equal to the UE's destination ID 3> instruct the physical layer to perform SL-PRS reception on the SL-PRS transmission occasion.

6.1.3.xx SL-PRS Resource Request MAC CE

The SL-PRS resource request MAC CE is identified by a MAC subheader with [eLCID/LCID] as specified in Table 6.2.1-1b. It has the following fields:

Destination layer-2 ID: The Destination Index field identifies the destination. The length of this field is 5 bits. The value is set to one index corresponding to SL destination identity associated to same destination reported in [ffs_RRCConfiguredList] if present. The value is indexed sequentially from 0 in the same ascending order of SL destination identity in [ffs_RRC-ConfiguredList] as specified in TS 38.331 [5]. When multiple lists are reported, the value is indexed sequentially across all the lists in the same order as presented in SidelinkUEInformaitonNR message;

Priority: Priority of SL-PRS that the UE wants to transmit.

In RAN1 #112bis ([6] RAN1 Chair's Notes of 3GPP TSG RAN WG1 #112bis), there are some agreements on sidelink positioning.

Agreement

A SL PRS resource refers to a time-frequency resource within a slot of a dedicated SL PRS resource pool that is used for SL PRS transmission.

FFS: for a shared resource pool

Characteristics associated with a SL PRS resource include at least:

SL PRS resource ID,

SL PRS comb offset and associated SL PRS comb size (N),

SL PRS starting symbol and number of SL PRS symbols (M),

SL PRS frequency domain allocation,

Note: Additional parameters can be included as/when identified.

FFS: other time domain aspects, if any

A SL PRS resource is identified by a SL PRS resource ID that is unique within a slot of a dedicated SL PRS resource pool.

NOTE 1: The above does not imply need for signalling/(pre-)configuration of all these parameters Agreement For SL-PRS transmission, either dedicated resource pool(s) or shared resource pool(s) or both can be (pre-)configured in the only SL BWP of a carrier.

A UE can be (pre-)configured with one or more dedicated SL resource pools.

A UE can be (pre-)configured with one or more shared SL resource pools.

Agreement

With regards to the SCI signaling in a shared resource pool, in addition to SL PRS transmission, the UE transmits Opt. 1: SCI1-A & a 2nd stage SCI format are used for SL-PRS indication FFS: Details including a new or existing 2nd stage SCI Agreement In Scheme 2, with regards to the triggering of SL-PRS, Support SL-PRS transmission triggering at the physical layer by the UE's own higher layers Working assumption: Support UE-A to request UE-B to transmit SL-PRS via lower layer signaling sent by UE-A.

Up to UE-B's own higher layers to transmit SL-PRS in response to the lower layer request from UE-A FFS: Lower layer signaling corresponds to SCI, MAC-CE, or SL-PRS In RAN1 #113 ([7] RAN1 Chair's Notes of 3GPP TSG RAN WG1 #113), there are some agreements on sidelink positioning.

Agreement

For a shared resource pool, SL PRS bandwidth is same as the bandwidth indicated for PSSCH.

Agreement

For a shared resource pool

A SL PRS resource refers to a time-frequency resource within a slot that is used for SL PRS transmission.

Characteristics associated with a SL PRS resource in a slot of a shared resource pool include at least:

SL PRS resource ID,

SL PRS comb offset and associated SL PRS comb size (N),

SL PRS starting symbol and number of SL PRS symbols (M),

SL PRS frequency domain allocation

SL PRS freq domain allocation is not used to identify a unique SL PRS resource ID A SL PRS resource is identified by a combination of SL PRS resource ID and a SL PRS frequency domain allocation. This combination is unique within a slot of a shared resource pool.

NOTE 1: The above does not imply need for signalling/(pre-)configuration of all these parameters Agreement PSSCH is not included in dedicated resource pool for SL positioning.

Agreement

In shared resource pools,

With regards to PSCCH and SL-PRS multiplexing, support Alt. B.1. from previous agreement (i.e., Only TDMing is supported)

Agreement

In a shared resource pool, SL-PRS, associated PSCCH and PSSCH scheduled by the PSCCH are included in the same slot:

With regards to PSSCH and SL-PRS multiplexing, only TDMing is supported for the already agreed comb sizes 1, 2, 4

Agreement

In a shared resource pool, SL-PRS, associated PSCCH and PSSCH scheduled by the PSCCH are included in the same slot:

The PSSCH is used for 2nd SCI and SL-SCH

Note: the UE may not have data available for transmission. Up to RAN2 how to define the specification support for this case.

In RAN1 #114 ([8] RAN1 Chair's Notes of 3GPP TSG RAN WG1 #114), there are some agreements on sidelink positioning.

Agreement

In a shared resource pool, when PSSCH and SL-PRS are multiplexed in the same slot, they share the same source ID, destination ID, cast type fields.

Agreement

In a shared resource pool,

To indicate the SCI format 2-D, the reserved state of the "2nd-stage SCI format" field (Codepoint "11") in SCI format 1-A is used Agreement In a shared resource pool, with regards to the fields in SCI format 2-D, include the following fields:

SL PRS resource information indication of the current slot—ceiling(log 2(#SL-PRS resources (pre-)configured in the resource pool) bits)

SL PRS request—0 or 1 bit

Embedded SCI format—[X] bit(s)

If the "Embedded SCI format" field is set to [0], the SCI 2-A fields are included with necessary padding If the "Embedded SCI format" field is set to [1], the SCI 2-B fields are included In RAN1 #114bis ([9] RAN1 Chair's Notes of 3GPP TSG RAN WG1 #114bis), there are some agreements on sidelink positioning.

Agreement

Confirm the following working assumption from RAN1 #114 with the following update:

For a shared resource pool,

Explicit (pre-)configuration of SL PRS resources in a slot, applicable for an indicated frequency domain allocation, includes:

SL PRS Resource ID, (M, N) pattern, comb offset.

For a given value of 'M', SL PRS resource is mapped to the last consecutive 'M' SL symbols in the slot that can be used for SL PRS, i.e., taking into consideration multiplexing with PSSCH DMRS, CSI-RS, PSFCH, gap symbols, AGC symbols, PSCCH in the slot Agreement With regards to the dedicated resource pool for positioning, suggest to the editors to align the terminology used as:

"Dedicated SL PRS resource pool" defined in 38.214 as shown below:

A sidelink resource pool which can be used for transmission of SL PRS and cannot be used for transmission of PSSCH will be referred to as dedicated SL PRS resource pool.

Agreement

With regards to the shared resource pool for positioning, suggest to the editors to align the terminology used as:

"shared SL PRS resource pool" defined in 38.214 as shown below:

A sidelink resource pool which can be used for transmission of both SL PRS and PSSCH will be referred to as shared SL PRS resource pool.

For New Radio (NR) Release-16/17 sidelink design, sidelink slots can be utilized for Physical Sidelink Broadcast Channel (PSBCH) or Physical Sidelink Control Channel (PSCCH)/Physical Sidelink Shared Channel (PSSCH)/Physical Sidelink Feedback Channel (PSFCH) transmission/reception. PSBCH is Time Division Multiplexed (TDMed), in slot level, from PSCCH/PSSCH/PSFCH. This means that sidelink slots except slots for PSBCH can be utilized for PSCCH/PSSCH/PSFCH transmission/reception. Moreover, the concept of sidelink resource pool for sidelink communication is utilized for PSCCH/PSSCH and/or PSFCH transmission/reception. A sidelink (communication) resource pool will comprise a set of sidelink slots (except at least slots for PSBCH) and a set of frequency resources. Different sidelink (communication) resource pools may be TDMed and/or Frequency Division Multiplexed (FDMed). More specifically, a PSCCH in one sidelink (communication) resource pool can only schedule PSSCH resource(s) in the same one sidelink (communication) resource pool. A PSCCH in one sidelink (communication) resource pool is not able to schedule PSSCH resource(s) in another sidelink (communication) resource pool. For a PSCCH/PSSCH, an associated PSFCH is in the same sidelink (communication) resource pool, instead of in different sidelink (communication) resource pools.

One sidelink (communication) resource pool will comprise multiple sub-channels in frequency domain, wherein a sub-channel comprises multiple contiguous Physical Resource Blocks (PRBs) in frequency domain. One PRB comprises multiple Resource Elements (REs), e.g., one PRB consists of 12 REs. Configuration of the sidelink resource pool will indicate the number of PRBs of each sub-channel in the corresponding sidelink resource pool. Sub-channel based resource allocation in frequency domain is supported for PSSCH. For a PSSCH resource scheduled by a PSCCH in the same sidelink slot, a fixed relationship between the PSCCH and the PSSCH resource is specified, which means that the PSCCH will be located in the lowest (index of) sub-channel of the scheduled PSSCH resource. As for a scheduled PSSCH resource in different slot(s), starting frequency position of the scheduled PSSCH resource will be scheduled/indicated by sidelink control information, instead of a fixed relationship.

In current NR Release-16/17 sidelink design, one Sidelink Control Information (SCI) could indicate at most three PSSCH resources via Frequency resource assignment and/or Time resource assignment in the SCI. The SCI may comprise a 1st stage SCI and a 2nd stage SCI. The 1st stage SCI may be transmitted via PSCCH. The 2nd stage SCI may be transmitted via multiplexing with the scheduled PSSCH resource in the same sidelink slot, e.g., the first PSSCH resource. In other words, the SCI can schedule at most two PSSCH resources in later sidelink slots, e.g., the second PSSCH resource and/or the third PSSCH resource. The at most three PSSCH resources are in different slots in a sidelink (communication) resource pool. The at most three PSSCH resources are within 32 consecutive slots in a sidelink resource pool. The at most three PSSCH resources scheduled by the SCI are utilized/associated with a same sidelink data packet, e.g., a same Transport Block (TB) or a same Medium Access Control (MAC) Protocol Data Unit (PDU). Note that standalone PSCCH/SCI is not supported in NR sidelink, which means that for each PSSCH transmission in a slot, there will be a corresponding PSCCH/SCI transmission in the same slot, and vice versa.

Figure 5:
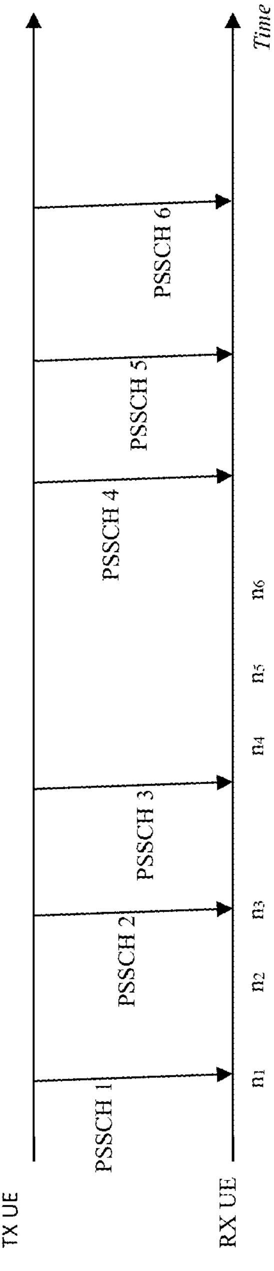
FIG. 5 is an example diagram showing multiple PSSCH transmissions for a same sidelink data packet: PSSCH 1 is an initial/new PSSCH transmission and PSSCH 2-6 are PSSCH retransmissions, in accordance with embodiments of the present invention.

Furthermore, a Transmission (TX) User Equipment (UE) may transmit the same sidelink data packet via multiple PSSCH transmissions, e.g., the PSSCH 1 (the initial/new PSSCH transmission) and PSSCH 2-6 (PSSCH retransmission) in FIG. 5. The TX UE may transmit SCI 1 in slot $n_1$ for indicating/scheduling PSSCH 1-3. The TX UE may transmit SCI 2 in slot $n_2$ for indicating/scheduling PSSCH 2-4. The TX UE may transmit SCI 3 in slot $n_3$ for indicating/scheduling PSSCH 3-5. The TX UE may transmit SCI 4 in slot $n_4$ for indicating/scheduling PSSCH 4-6. The TX UE may transmit SCI 5 in slot $n_3$ for indicating/scheduling PSSCH 5-6. The TX UE may transmit SCI 6 in slot ne for indicating/scheduling PSSCH 6. For the same sidelink data packet, the TX UE may indicate/set the SCI 1-6 with/as the same Hybrid Automatic Repeat Request (HARQ) process number, the same New Data Indicator (NDI) value, the same (Layer-1) source Identity (ID), the same (Layer-1) destination ID, and the same cast type.

In current NR Release-16/17 sidelink design, there are two sidelink resource allocation modes defined for NR sidelink communication:

Mode 1 is that a base station/network node can schedule sidelink resource(s) to be used by UE for sidelink transmission(s).

Mode 2 is that a UE determines (i.e., base station/network node does not schedule) sidelink transmission resource (s) within sidelink resources configured by the base station/network node or pre-configured sidelink resources.

For UE (autonomous) selection mode, e.g., NR sidelink resource allocation mode 2, since transmission resource is not scheduled via a network node, the UE may require performing sensing before selecting a resource for transmission (e.g., sensing-based transmission), in order to avoid resource collision and interference from or to other UEs (especially UEs using NR sidelink). Full sensing is supported from NR Rel-16 sidelink, while partial sensing is supported from NR Rel-17 sidelink. Based on the result of the sensing procedure, the UE can determine a valid/identified resource set. The valid/identified resource set may be reported to higher layers (of the UE). The UE may (randomly) select one or multiple valid/identified resources from the valid/identified resource set to perform sidelink transmission(s) from the UE. The sidelink transmission(s) from the UE may be PSCCH and/or PSSCH transmission. As shown in FIG. 5, the TX UE may (randomly) select 6 valid/identified resources to perform PSSCH 1-6 transmissions for transmitting the same sidelink data packet.

For network scheduling mode, e.g., NR sidelink resource allocation mode 1, dynamic grant, configured grant Type 1, and configured grant Type 2 are supported in [2]3GPP TS 38.214 V18.0.0. Regarding dynamic grant, the network node may transmit a Sidelink (SL) grant, e.g., Downlink Control Information (DCI) format 3_0 scrambled by SL-Radio Network Temporary Identifier (RNTI), on Uu interface for scheduling at most three PSSCH resources (for a same sidelink data packet) to a TX UE. The sidelink grant also comprises "resource pool index" for indicating one sidelink (communication) resource pool, wherein the scheduled at most three PSCCH/PSSCH resources are within the indicated one sidelink (communication) resource pool. The TX UE may perform PSCCH and PSSCH transmissions on PC5 interface, in response to the received sidelink grant, for a sidelink data packet. As shown in FIG. 5, the TX UE may receive a first sidelink grant indicating three resources for performing PSSCH 1-3 transmissions for transmitting the same sidelink data packet. The TX UE may receive a second sidelink grant indicating another three resources for performing PSSCH 4-6 transmissions for transmitting the same sidelink data packet. The network may indicate/set the same SL HARQ process number and the same NDI value in the first sidelink grant and the second sidelink grant, so the TX UE can know that the first sidelink grant and the second sidelink grant are utilized for the same sidelink data packet.

The Uu interface means the wireless interface for communication between network and UE. The PC5 interface means the wireless interface for communication (directly) between UEs/devices.

In NR Release 18, a new reference signal for SL positioning/ranging, noted as SL Positioning Reference Signal (PRS), is introduced. SL PRS (or SL-PRS) measurements may be utilized for positioning/ranging solutions, such as SL Round Trip Time (RTT), SL-Angle of Arrival (AoA), SL-Time Difference Of Arrival (TDOA), SL-Angle of Departure (AoD). For supporting time-based positioning methods, larger bandwidth for SL PRS may be required for higher accuracy positioning. It is quite possible that the required bandwidth for SL PRS may be 10 MHz, 20 MHz, or even more, especially in higher frequency bands.

Furthermore, given the larger bandwidth requirement of SL PRS, Comb-N SL PRS design can be supported for providing more available SL PRS resources, and configured/adjusted symbol number can be supported as one SL PRS occasion. The potential candidate value of N may be 1, 2, 4, 6, and there are at least some possible designs of SL PRS pattern, given M symbol and comb-N:

Fully staggered SL PRS pattern, M=N, and at each symbol a different RE offset is used.

Partially staggered SL PRS pattern, M<N, at each symbol a different RE offset is used.

Unstaggered SL PRS patterns, N>1, at each symbol a same RE offset is used.

Preferably in certain embodiments, for comb-N SL PRS design/structure, possible frequency/comb offsets may be 0 to (N−1).

With regard to the SL PRS resources/transmissions, there are two kinds of sidelink resource pools: a dedicated SL PRS resource pool and a shared SL PRS resource pool (shared with sidelink communication).

In a dedicated SL PRS pool, there is no PSSCH/PSFCH resources. The TX UE may transmit a PSCCH carrying SCI format 1-B for scheduling/allocating an SL PRS resource/transmission within a same slot.

In a shared SL PRS resource pool, SL PRS transmission(s) can be multiplexed with PSSCH resources. The TX UE may transmit a PSCCH carrying SCI format 1-A and also transmit a $2^{nd}$-stage SCI, e.g., SCI format 2-D, for scheduling/allocating both an SL PRS resource/transmission and a PSSCH transmission within a same slot. When PSSCH and SL PRS are multiplexed in the same slot, they will share the same source ID, destination ID, cast type fields.

For SL PRS resource allocation, scheme/mode 1 and scheme/mode 2 are introduced.

Scheme/mode 1: Network-centric operation SL PRS resource allocation (e.g., similar to a legacy NR Mode 1 for PSSCH).

The network node (e.g., Next Generation Node B (gNB), Location Management Function (LMF), gNB & LMF) allocates resources for SL PRS.

Scheme/mode 2: TX UE autonomous SL PRS resource allocation (e.g., similar to legacy NR Mode 2 for PSSCH).

At least one of the UE(s) participating in the sidelink positioning operation allocates resources for SL PRS.

According to RAN1 #112bis ([6] RAN1 Chair's Notes of 3GPP TSG RAN WG1) and 114bis ([9] RAN1 Chair's Notes of 3GPP TSG RAN WG1), it supports UE-A to request UE-B to transmit SL PRS via lower layer signaling sent by UE-A, wherein the lower layer signaling sent by UE-A is SCI with the SL PRS request field set to 1, e.g., SCI format 1-B or SCI format 2-D. When UE-B receives the SCI format 1-B or 2-D with the SL PRS request field set to 1, UE-B will report this request for SL PRS transmission higher layers of the UE-B. Then, the higher layer of UE-B may trigger the lower layer of UE-B to transmit SL PRS. Moreover, for a shared SL PRS resource pool, an SL PRS resource in a slot is identified by a combination of an SL PRS resource ID and an SL PRS frequency domain allocation. The SL PRS frequency domain allocation is equal to multiplexed PSSCH frequency domain allocation. The SL PRS resource ID is associated with a (M, N) pattern and comb offset based on (pre-)configuration of SL PRS resources in/for a slot.

According to draft CR for TS 38.321 ([5]R2-2312264) quoted below, it seems that in a shared SL PRS resource pool, an SL PRS transmission shall be multiplexed from an initial PSSCH transmission and then the same SL PRS transmission can be multiplexed in the following PSSCH retransmission. For instance as shown in FIG. 5, if the TX UE wants to multiplex an SL PRS transmission with a PSSCH transmission, the TX UE shall start to multiplex the SL PRS transmission with PSSCH 1 transmission. Once the TX UE multiplexed the SL PRS transmission with PSSCH 1, the TX UE may continue to multiplex the SL PRS transmission with following PSSCH retransmission(s), i.e., PSSCH 2-6. However, if the TX UE triggers or is triggered an SL PRS transmission at a timing later than slot $n_1$, the TX UE is not able to multiplex the SL PRS transmission in any of the PSSCH retransmissions, even though they are associated with the same source ID, destination ID, cast type. Such restrictions will induce latency of SL PRS transmission.

Figure 6:
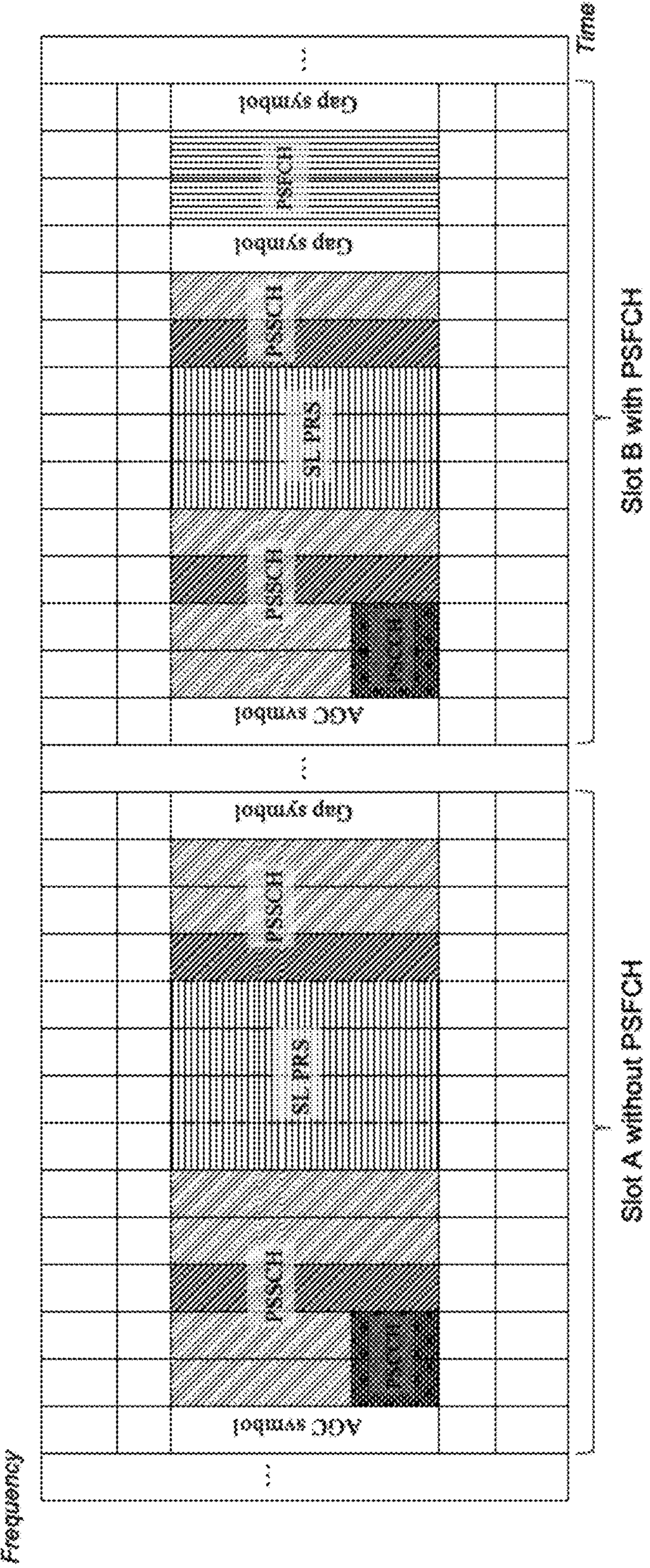
FIG. 6 is an example diagram showing that in a slot A without PSFCH resources, there may be at most 4 symbols used for an SL PRS transmission ($M \leq 4$); while in a slot B with PSFCH resources, there may be at most 3 symbols used for the SL PRS transmission ($M \leq 3$), in accordance with embodiments of the present invention.

Second, when the PSSCH and the SL PRS transmission are multiplexed in the same slot, an SL PRS resource ID is set in/from the initial PSSCH transmission. There is no chance to re-set the SL PRS resource ID in PSSCH retransmission(s). Given the SL PRS resource ID, the SL PRS transmission is associated with a (M, N) pattern and a comb offset. However, in some cases, the available symbols for PSSCH and SL PRS will be changed in different slots. For instance as shown in FIG. 6, in a slot A without PSFCH resources, there may be at most 4 symbols used for the SL PRS transmission (M≤4); while in a slot B with PSFCH resources, there may be at most 3 symbols used for the SL PRS transmission (M≤3). This is because SL PRS transmission cannot be transmitted in a symbol with PSSCH Demodulation Reference Signal (DMRS) (i.e., PSSCH symbol with deeper shade/color in FIG. 6) or $2^{nd}$-stage SCI (multiplexed with PSSCH from the beginning/earlier part of PSSCH resources in a slot). In these cases, it is not clear how to handle the multiplexing of PSSCH and the SL PRS transmission.

Third, it seems that in a shared SL PRS resource pool, a SL PRS request field set to request/i shall be set from an initial PSSCH transmission. There is no chance to re-set the SL PRS request field in PSSCH retransmission(s). It may induce that if the TX UE requests paired UE(s) to transmit SL PRS in an initial PSSCH transmission, the TX UE will continuously request the paired UE(s) to transmit SL PRS in a following PSSCH retransmission. Such continuous requesting may induce unnecessary multiple SL PRS transmissions from the paired UE(s). If the TX UE does not request paired UE(s) to transmit SL PRS in an initial PSSCH transmission, the TX UE will not be able to request the paired UE(s) to transmit SL PRS in the following PSSCH retransmission. It will induce latency to request SL PRS from the paired UE(s).

Fourth, in the current TS 38.212 ([3]3GPP TS 38.212 V18.0.0), the SL PRS request field is present in SCI format 1-B for a dedicated SL PRS resource pool and in SCI format 2-D for a shared SL PRS resource pool. However, since SCI format 2-D schedules both SL PRS and PSSCH transmission, it means that if the TX UE wants to request paired UE(s) to transmit SL PRS, i.e., set the SL PRS request field as request/1, the TX UE needs to first transmit SL PRS scheduled by SCI format 2-D, even though the TX UE does not trigger such SL PRS transmission to the paired UE(s). For each sidelink grant that is not on a SL-PRS dedicated resource pool, the Sidelink HARQ Entity shall:

1> if the MAC entity determines that the sidelink grant is used for initial transmission as specified in clause 5.22.1.1; or 1> if the sidelink grant is a configured sidelink grant and no MAC PDU has been obtained in an sl-PeriodCG of the configured sidelink grant; or 1> if the sidelink grant is a dynamic sidelink grant or selected sidelink grant and no MAC PDU has been obtained in the previous sidelink grant when PSCCH duration(s) and $2^{nd}$ stage SCI on PSSCH of the previous sidelink grant is not in SL DRX Active time as specified in clause 5.28.3 of any destination that has data to be sent:

NOTE 1: Void.

2> (re-)associate a Sidelink process to this grant, and for the associated Sidelink process:

2> if all PSCCH duration(s) and PSSCH duration(s) for initial transmission of a MAC PDU of the dynamic sidelink grant or the configured sidelink grant is not in SL DRX Active time as specified in clause 5.28.3 of the destination that has data to be sent:

3> ignore the sidelink grant.

NOTE 1A: The Sidelink HARQ Entity will associate the selected sidelink grant to the Sidelink process determined by the MAC entity.

2> else:

3> obtain the MAC PDU to transmit from the Multiplexing and assembly entity, if any;

3> if a MAC PDU to transmit has been obtained:

4> if a HARQ Process ID has been set for the sidelink grant:

5> (re-)associate the HARQ Process ID corresponding to the sidelink grant to the Sidelink process.

NOTE 1a: There is one-to-one mapping between a HARQ Process ID and a Sidelink process in the MAC entity configured with Sidelink resource allocation mode 1.

4> determines Sidelink transmission information of the TB for the source and destination pair of the MAC PDU as follows:

5> set the Source Layer-1 ID to the 8 least significant bit (LSB) of the Source Layer-2 ID of the MAC PDU;

5> set the Destination Layer-1 ID to the 16 LSB of the Destination Layer-2 ID of the MAC PDU;

5> (re-)associate the Sidelink process to a Sidelink process ID;

5> set the Redundancy version to the selected value.

5> If the sidelink grant is associated with request from the higher laver for triggering the SL-PRS transmission of the peer UE Identified by the Destination layer-2 ID:

6> set the SL-PRS request to request.

5> set the SL-PRS resource ID to [the value of the field], if available, within Sidelink transmission information.

Editor's NOTE: FFS bow the SL-PRS resource ID Is determined and Its Impacts to MAC.

4> deliver the MAC PDU. SL-PRS, if available, the sidelink grant and the Sidelink transmission information of the TB to the associated Sidelink process;

4> instruct the associated Sidelink process to trigger a new transmission.

3> else;

4> flush the HARQ buffer of the associated Sidelink process.

1> else (i.e., retransmission):

2> if the HARQ Process ID corresponding to the sidelink grant received on Physical Downlink Control Channel (PDCCH), the configured sidelink grant or the selected sidelink grant is associated to a Sidelink process of which HARQ buffer is empty; or 2> if the HARQ Process ID corresponding to the sidelink grant received on PDCCH is not associated to any Sidelink process; or 2> if PSCCH duration(s) and PSSCH duration(s) for one or more retransmissions of a MAC PDU of the dynamic sidelink grant or the configured sidelink grant is not in SL DRX Active time as specified in clause 5.28.3 of the destination that has data to be sent:

3> ignore the sidelink grant.

2> else:

3> identify the Sidelink process associated with this grant, and for the associated Sidelink process:

4> deliver the sidelink grant of the MAC PDU and the SL-PRS, if available, to the associated Sidelink process;

4> instruct the associated Sidelink process to trigger a retransmission.

To deal with these issues, various concepts, mechanisms, methods, aspects, and/or embodiments are provided in the following:

Concept A

Concept A allows a TX UE to start to multiplex an SL PRS transmission with a first PSSCH retransmission in a first slot. The TX UE may not multiplex the SL PRS transmission with an initial/new PSSCH transmission. The TX UE may perform the initial/new PSSCH transmission before the TX UE performs the first PSSCH retransmission. The initial/new PSSCH transmission and the first PSSCH retransmission are for transmitting a same sidelink data packet or MAC PDU.

Preferably in certain embodiments, the TX UE may trigger or be triggered for the SL PRS transmission in a first timing later than the initial/new PSSCH transmission. Preferably in certain embodiments, the trigger may occur before the timing of sending the initial/new PSSCH transmission and there is no sufficient time or sufficient space/resource (e.g., some Quality of Service (QoS)/decoding requirement for the initial/first PSSCH transmission) to multiplex the SL PRS into the initial/new PSSCH transmission.

Preferably in certain embodiments, Concept A also allows that the TX UE may not multiplex the SL PRS transmission with a second PSSCH retransmission in a second slot, wherein the second PSSCH retransmission is performed after the first PSSCH retransmission and wherein the second PSSCH retransmission and the first PSSCH retransmission are for transmitting the same sidelink data packet or MAC PDU. Preferably in certain embodiments, the TX UE may cancel the triggering of the SL PRS transmission in a second timing before the second PSSCH retransmission or the second slot. Preferably in certain embodiments, the TX UE may cancel the triggering of the SL PRS transmission in the second timing after the first PSSCH retransmission. Preferably in certain embodiments, the TX UE may cancel the triggering of the SL PRS transmission in response to the SL PRS transmission multiplexed with the first PSSCH retransmission. Preferably in certain embodiments, the TX UE may cancel the triggering of the SL PRS transmission in response that the TX UE performs the SL PRS transmission for a first number of times. The first number may be specified or (pre-)configured (e.g., configured in sidelink resource pool configuration or SL PRS-related configuration) or provided by a higher layer (e.g., any of MAC layer, Radio Resource Control (RRC) layer, Sidelink Positioning Protocol (SLPP) layer, or positioning/raging application layer). Preferably in certain embodiments, the TX UE may perform the first number of PSSCH transmissions multiplexing with the SL PRS transmission. The first number of PSSCH transmissions comprise the first PSSCH transmission. Preferably in certain embodiments, the TX UE may perform the first number of PSSCH transmissions before the second PSSCH retransmission. Preferably or alternatively in certain embodiments, the second PSSCH retransmission may not be able to multiplex the SL PRS transmission, e.g., due to no sufficient symbols for SL PRS transmission in the second PSSCH retransmission, or due to there being PSFCH resources in the second slot.

Preferably in certain embodiments, the SL PRS transmission and the first PSSCH retransmission are associated with the same (Layer-1 or Layer-2) source ID, the same (Layer-1 or Layer-2) destination ID, and the same cast type.

Preferably in certain embodiments, the first PSSCH retransmission and the initial/new PSSCH transmission are associated with the same HARQ process number, the same NDI value, the same (Layer-1 or Layer-2) source ID, the same (Layer-1 or Layer-2) destination ID, and the same cast type. Preferably in certain embodiments, the first PSSCH retransmission and the second PSSCH retransmission are associated with the same HARQ process number, the same NDI (New data indicator) value, the same (Layer-1 or Layer-2) source ID, the same (Layer-1 or Layer-2) destination ID, and the same cast type. Preferably in certain embodiments, the first PSSCH retransmission, the initial/new PSSCH transmission, and/or the second PSSCH retransmission are performed by the TX UE in a same sidelink resource pool.

For instance as shown in FIG. 5, the TX UE may perform the PSSCH 1 and PSSCH 2 transmission without multiplexing the SL PRS transmission. The TX UE may trigger or be triggered for SL PRS transmission in a first timing later than slot $n_2$ and earlier than slot $n_3$. The TX UE may perform the PSSCH 3-5 transmissions with multiplexing the SL PRS transmission in response to the triggering. The first number may be 3 in this instance. The TX UE may cancel the triggering of the SL PRS transmission in response to the SL PRS transmission multiplexed in PSSCH 3-5 transmissions. The TX UE may perform the PSSCH 6 transmission without multiplexing the SL PRS transmission.

Preferably or alternatively in certain embodiments, PSSCH 3-5 may be associated with the same or different MAC PDUs. In case of different MAC PDUs, this means that the TX UE may multiplex the SL PRS transmission corresponding to the same trigger into different MAC PDUs or into different PSSCH transmissions for transmitting different sidelink data packets or MAC PDUs. The TX UE may (trigger to) request more/additional new SL grant (e.g., sending a Scheduling Request (SR) or trigging MAC CE in mode 1 or select a new sidelink grant in mode 2) for sending/multiplexing the remaining SL PRS transmissions corresponding to the same trigger.

Preferably in certain embodiments, based on the method/concept A, a text proposal 1 (bolded and underlined) may be provided as below.

For each sidelink grant that is not on SL-PRS dedicated resource pool. the Sidelink HARQ Entity shall:

1> if the MAC entity determines that the sidelink grant is used for initial transmission as specified in clause 5.22.1.1; or 1> if the sidelink grant is a configured sidelink grant and no MAC PDU has been obtained in an sl-PeriodCG of the configured sidelink grant; or 1> if the sidelink grant is a dynamic sidelink grant or selected sidelink grant and no MAC PDU has been obtained in the previous sidelink grant when PSCCH duration(s) and 2nd stage SCI on PSSCH of the previous sidelink grant is not in SL DRX Active time as specified in clause 5.28.3 of any destination that has data to be sent:

NOTE 1: Void.

2> (re-)associate a Sidelink process to this grant, and for the associated Sidelink process;

2> if all PSCCH duration(s) and PSSCH duration(s) for initial transmission of a MAC PDU of the dynamic sidelink grant or the configured sidelink grant is not in SL DRX Active time as specified in clause 5.28.3 of the destination that has data to be sent:

3> ignore the sidelink grant.

NOTE 1A: The Sidelink HARQ Entity will associate the selected sidelink grant to the Sidelink process determined by the MAC entity.

2> else:

3> obtain the MAC PDU to transmit from the Multiplexing and assembly entity, if any;

3> if a MAC PDU to transmit has been obtained:

4> if a HARQ Process ID has been set for the sidelink grant:

5> (re-)associate the HARQ Process ID corresponding to the sidelink grant to the Sidelink process.

NOTE 1a: There is one-to-one mapping between a HARQ Process ID and a Sidelink process in the MAC entity configured with Sidelink resource allocation mode 1.

4> determines Sidelink transmission information of the TB for the source and destination pair of the MAC PDU as follows;

5> set the Source Layer-1 ID to the 8 LSB of the Source Layer-2 ID of the MAC PDU;

5> set the Destination Layer-1 ID to the 16 LSB of the Destination Layer-2 ID of the MAC PDU;

5> (re-)associate the Sidelink process to a Sidelink process ID;

5> set the Redundancy version to the selected value.

5> if the sidelink grant is associated with request from the higher layer for triggering the SL-PRS transmission of the peer UE identified by the Destination layer-2 ID:

6> set the SL-PRS request to request.

5> set the SL-PRS resource ID to [the value of the field], if available, within Sidelink transmission information.

Editor's NOTE: FFS how the SL-PRS resource ID is determined and its impacts to MAC.

4> deliver the MAC PDU. SL-PRS, if available, the sidelink grant and the Sidelink transmission information of the TB to the associated Sidelink process;

4> instruct the associated Sidelink process to trigger a new transmission.

3> else;

4> flush the HARQ buffer of the associated Sidelink process.

1> else (i.e., retransmission):

2> if the HARQ Process ID corresponding to the sidelink grant received on PDCCH, the configured sidelink grant or the selected sidelink grant is associated to a Sidelink process of which HARQ buffer is empty; or 2> if the HARQ Process ID corresponding to the sidelink grant received on PDCCH is not associated to any Sidelink process; or 2> if PSCCH duration(s) and PSSCH duration(s) for one or more retransmissions of a MAC PDU of the dynamic sidelink grant or the configured sidelink grant is not in SL DRX Active time as specified in clause 5.28.3 of the destination that has data to be sent:

3> ignore the sidelink grant.

2> else:

3> set the SL-PRS resource ID to [the value of the field], if available. within Sidelink transmission Information.

3> identify the Sidelink process associated with this grant, and for the associated Sidelink process:

4> deliver the sidelink grant of the MAC PDU and SL-PRS, if available, to the associated Sidelink process; (Addition 1)

4> deliver the sidelink grant of the MAC PDU and the SL-PRS, if the corresponding trimer is still pending, to the associated Sidelink process; (Addition 2)

4> instruct the associated Sidelink process to trigger a retransmission.

Concept B

Concept B is that a TX UE may change SL PRS resource and/or SL PRS resource ID in different multiplexed PSSCH transmissions for a same sidelink data packet or MAC PDU.

In one embodiment, the TX UE may multiplex a first SL PRS transmission associated with a first SL PRS resource ID and a first PSSCH transmission in a first slot. The TX UE may multiplex a second SL PRS transmission associated with a second SL PRS resource ID and a second PSSCH transmission in a second slot, wherein the first PSSCH transmission and the second PSSCH transmission are for transmitting a same sidelink data packet. The Concept B is that the first SL PRS resource ID can be different from the second SL PRS resource ID. Preferably in certain embodiments, the first SL PRS transmission and the second SL PRS transmission may be associated with a different number of SL PRS symbols, a different comb-N structure, or a different comb/frequency/RE offset.

Preferably in certain embodiments, the first SL PRS resource ID may be associated with a first number of SL PRS symbols, a comb-N1 structure, and a first comb/frequency/RE offset. The second SL PRS resource ID may be associated with a second number of SL PRS symbols, a comb-N2 structure, and a second comb/frequency/RE offset. Preferably in certain embodiments, the first number of SL PRS symbols is different from the second number of SL PRS symbols. Preferably in certain embodiments, N1 is different from N2. Preferably in certain embodiments, the first comb/frequency/RE offset is different from the second comb/frequency/RE offset.

Preferably in certain embodiments, the second SL PRS transmission may be retransmission of the first SL PRS transmission. Preferably in certain embodiments, the first SL PRS transmission and the first PSSCH transmission are associated with the same (Layer-1 or Layer-2) source ID, the same (Layer-1 or Layer-2) destination ID, and the same cast type. Preferably in certain embodiments, the second SL PRS transmission and the second PSSCH transmission are associated with the same (Layer-1 or Layer-2) source ID, the same (Layer-1 or Layer-2) destination ID, and the same cast type.

Preferably in certain embodiments, the first SL PRS transmission and the second SL PRS transmission may be associated with a same SL PRS triggering, e.g., triggered from higher layer. Preferably in certain embodiments, the first SL PRS transmission and the second SL PRS transmission may be associated with a same sidelink positioning service.

Preferably in certain embodiments, the TX UE performs the first PSSCH transmission and the second PSSCH transmission in a same sidelink resource pool, e.g., a same shared SL PRS resource pool.

Preferably in certain embodiments, the first slot in the sidelink resource pool does not comprise PSFCH symbols/resources/occasion(s). Preferably in certain embodiments, in response to the first slot without PSFCH symbols/resources/occasion(s), the TX UE may determine the first SL PRS resource ID.

Preferably in certain embodiments, the second slot in the sidelink resource pool comprises PSFCH symbols/resources/occasion(s). Preferably in certain embodiments, in response to the second slot with PSFCH symbols/resources/occasion(s), the TX UE may determine the second SL PRS resource ID.

Preferably in certain embodiments, in response to whether a slot comprises PSFCH symbols/resources/occasion(s) or not, the TX UE may determine different SL PRS resource IDs.

Preferably in certain embodiments, the TX UE may perform a plurality of PSSCH transmissions for transmitting the same sidelink data packet. Preferably in certain embodiments, the plurality of PSSCH transmissions may comprise a first set of PSSCH transmissions in a first set of slots without PSFCH symbols/resources/occasion(s) in the sidelink resource pool. If/when the TX UE determines to multiplex an SL PRS transmission with any one of the first set of PSSCH transmissions, the TX UE determines to multiplex the SL PRS transmission associated with the first SL PRS resource ID. Preferably in certain embodiments, the plurality of PSSCH transmissions may comprise a second set of PSSCH transmissions in a second set of slots with PSFCH symbols/resources/occasion(s) in the sidelink resource pool. If/when the TX UE determines to multiplex an SL PRS transmission with any one of the second set of PSSCH transmissions, the TX UE determines to multiplex the SL PRS transmission associated with the second SL PRS resource ID.

In one embodiment, the TX UE may multiplex the first SL PRS transmission associated with the first SL PRS resource ID and the first PSSCH transmission in the first slot. The TX UE may not multiplex SL PRS transmission with a third PSSCH transmission in a third slot, wherein the first PSSCH transmission and the third PSSCH transmission are for transmitting the same sidelink data packet.

Preferably in certain embodiments, the third SL PRS transmission may be retransmission of the first SL PRS transmission. Preferably in certain embodiments, the first SL PRS transmission and the first PSSCH transmission are associated with the same (Layer-1 or Layer-2) source ID, the same (Layer-1 or Layer-2) destination ID, and the same cast type.

Preferably in certain embodiments, the TX UE performs the first PSSCH transmission and the third PSSCH transmission in the same sidelink resource pool, e.g., the same shared SL PRS resource pool.

Preferably in certain embodiments, the first slot in the sidelink resource pool does not comprise PSFCH symbols/resources/occasion(s). Preferably in certain embodiments, in response to the first slot without PSFCH symbols/resources/occasion(s), the TX UE may determine the first SL PRS resource ID.

Preferably in certain embodiments, the third slot in the sidelink resource pool comprises PSFCH symbols/resources/occasion(s). Preferably in certain embodiments, in response to the third slot with PSFCH symbols/resources/occasion(s), the TX UE may determine to not multiplex SL PRS transmission with the third PSSCH transmission.

Preferably in certain embodiments, in response to whether a slot comprises PSFCH symbols/resources/occasion(s) or not, the TX UE may determine whether to multiplex SL PRS transmission or not.

Preferably in certain embodiments, the TX UE may perform a plurality of PSSCH transmissions for transmitting the same sidelink data packet. Preferably in certain embodiments, the plurality of PSSCH transmissions may comprise a first set of PSSCH transmissions in a first set of slots without PSFCH symbols/resources/occasion(s) in the sidelink resource pool. If/when the TX UE determines to multiplex an SL PRS transmission with any one of the first set of PSSCH transmissions, the TX UE determines to multiplex the SL PRS transmission associated with the first SL PRS resource ID. Preferably in certain embodiments, the plurality of PSSCH transmissions may comprise a third set of PSSCH transmissions in a third set of slots with PSFCH symbols/resources/occasion(s) in the sidelink resource pool. In response to whether a slot comprises PSFCH symbols/resources/occasion(s) or not, the TX UE may determine whether to multiplex SL PRS transmission or not.

On the other hand, a TX UE may keep the same SL PRS resource and/or SL PRS resource ID in different multiplexed PSSCH transmissions for a same sidelink data packet or MAC PDU. The RX UE would de-multiplex the SL PRS considering or based on PSFCH occasions and the SL PRS resource ID.

For any of embodiments above or herein, the slot comprising/with PSFCH symbols/resources/occasion(s) may comprise or mean or replace the slot comprising/with symbols for SL PRS being smaller than a threshold value. The threshold value may be the first number of SL PRS symbols, or a specified or configured value.

For any of embodiments above or herein, the slot not comprising/without PSFCH symbols/resources/occasion(s) may comprise or mean or replace the slot comprising/with symbols for SL PRS being larger than or equal to the threshold value.

For any of embodiments above or herein, the slot comprising/with PSFCH symbols/resources/occasion(s) may comprise or mean or replace the slot comprising/with symbols for PSSCH being smaller than a configured or specified value.

For any of embodiments above or herein, the slot not comprising/without PSFCH symbols/resources/occasion(s) may comprise or mean or replace the slot comprising/with symbols for PSSCH being larger than a configured or specified value.

Preferably in certain embodiments, based on the method/concept B, a text proposal 2 (bolded and underlined) may be provided as below.

For each sidelink grant that is not on SL-PRS dedicated resource pool, the Sidelink HARQ Entity shall:

1> if the MAC entity determines that the sidelink grant is used for initial transmission as specified in clause 5.22.1.1; or 1> if the sidelink grant is a configured sidelink grant and no MAC PDU has been obtained in an sl-PeriodCG of the configured sidelink grant; or 1> if the sidelink grant is a dynamic sidelink grant or selected sidelink grant and no MAC PDU has been obtained in the previous sidelink grant when PSCCH duration(s) and $2^{nd}$ stage SCI on PSSCH of the previous sidelink grant is not in SL DRX Active time as specified in clause 5.28.3 of any destination that has data to be sent:

NOTE 1: Void.

2> (re-)associate a Sidelink process to this grant, and for the associated Sidelink process;

2> if all PSCCH duration(s) and PSSCH duration(s) for initial transmission of a MAC PDU of the dynamic sidelink grant or the configured sidelink grant is not in SL DRX Active time as specified in clause 5.28.3 of the destination that has data to be sent:

3> ignore the sidelink grant.

NOTE 1A: The Sidelink HARQ Entity will associate the selected sidelink grant to the Sidelink process determined by the MAC entity.

2> else:

3> obtain the MAC PDU to transmit from the Multiplexing and assembly entity, if any;

3> if a MAC PDU to transmit has been obtained:

4> if a HARQ Process ID has been set for the sidelink grant:

5> (re-)associate the HARQ Process ID corresponding to the sidelink grant to the Sidelink process.

NOTE 1a: There is one-to-one mapping between a HARQ Process ID and a Sidelink process in the MAC entity configured with Sidelink resource allocation mode 1.

4> determines Sidelink transmission information of the TB for the source and destination pair of the MAC PDU as follows:

5> set the Source Layer-1 ID to the 8 LSB of the Source Layer-2 ID of the MAC PDU;

5> set the Destination Layer-1 ID to the 16 LSB of the Destination Layer-2 ID of the MAC PDU;

5> (re-)associate the Sidelink process to a Sidelink process ID;

5> set the Redundancy version to the selected value.

5> if the sidelink grant is associated with request from the higher layer for triggering the SL-PRS transmission of the peer UE identified by the Destination layer-2 ID:

6> set the SL-PRS request to request.

5> set the SL-PRS resource ID to [the value of the field], if available, within Sidelink transmission information.

Editor's NOTE: FFS how the SL-PRS resource ID is determined and its impacts to MAC.

4> deliver the MAC PDU, SL-PRS. if available, the sidelink grant and the Sidelink transmission information of the TB to the associated Sidelink process;

4> instruct the associated Sidelink process to trigger a new transmission.

3> else;

4> flush the HARQ buffer of the associated Sidelink process.

1> else (i.e., retransmission):

2> if the HARQ Process ID corresponding to the sidelink grant received on PDCCH, the configured sidelink grant or the selected sidelink grant is associated to a Sidelink process of which HARQ buffer is empty; or 2> if the HARQ Process ID corresponding to the sidelink grant received on PDCCH is not associated to any Sidelink process; or 2> if PSCCH duration(s) and PSSCH duration(s) for one or more retransmissions of a MAC PDU of the dynamic sidelink grant or the configured sidelink grant is not in SL DRX Active time as specified in clause 5.28.3 of the destination that has data to be sent:

3> ignore the sidelink grant.

2> else:

3> set (the) SL-PRS resource ID to [the value of the field], if available, within Sidelink transmission information. (Addition 1)

3> set the SL-PRS resource ID to [the value of the field], if changed, within Sidelink transmission information.(Addition 2)

3> identify the Sidelink process associated with this grant, and for the associated Sidelink process:

4> deliver the sidelink grant of the MAC PDU and the SL-PRS. if available. to the associated Sidelink process; (Addition 1)

4> deliver the sidelink grant of the MAC PDU and the SL-PRS, if the corresponding trimer is still pending, to the associated Sidelink process; (Addition 2)

4> instruct the associated Sidelink process to trigger a retransmission.

Note: UE may set the SL-PRS resource ID considering existence of PSFCH occasion(s).

Concept C

Concept C is to allow a TX UE to start to request SL PRS from other UE(s)/destination(s) in a first SCI scheduling a first PSSCH retransmission in a first slot. Preferably in certain embodiments, the TX UE may transmit the first SCI and the first PSSCH retransmission to the other UE(s)/destination(s) in the first slot. Preferably in certain embodiments, the TX UE may set a field in the first SCI for indicating SL PRS request, e.g., set "SL PRS request" field as request/1.

Preferably in certain embodiments, the TX UE may not request SL PRS from the other UE(s)/destination(s) via another SCI scheduling an initial/new PSSCH transmission. The TX UE may transmit the another SCI and the initial/new PSSCH transmission before the TX UE performs the first PSSCH retransmission. The initial/new PSSCH transmission and the first PSSCH retransmission are for transmitting a same sidelink data packet.

Preferably in certain embodiments, the TX UE may determine to request SL PRS from other UE(s)/destination(s) in a first timing later than the initial/new PSSCH transmission.

Preferably in certain embodiments, Concept C also allows that the TX UE may not request SL PRS from other UE(s)/destination(s) in a second SCI scheduling a second PSSCH retransmission in a second slot, wherein the second PSSCH retransmission is performed after the first PSSCH retransmission and wherein the second PSSCH retransmission and the first PSSCH retransmission are for transmitting the same sidelink data packet. Preferably in certain embodiments, the TX UE may cancel the SL PRS request in a second timing before the second PSSCH retransmission or the second slot. Preferably in certain embodiments, the TX UE may cancel the SL PRS request in the second timing after the first PSSCH retransmission. Preferably in certain embodiments, the TX UE may cancel the SL PRS request in response to the transmission of the first SCI or the first PSSCH retransmission.

Preferably in certain embodiments, the first PSSCH retransmission and the initial/new PSSCH transmission are associated with the same HARQ process number, the same NDI value, the same (Layer-1 or Layer-2) source ID, the same (Layer-1 or Layer-2) destination ID, and the same cast type. Preferably in certain embodiments, the first PSSCH retransmission and the second PSSCH retransmission are associated with the same HARQ process number, the same NDI value, the same (Layer-1 or Layer-2) source ID, the same (Layer-1 or Layer-2) destination ID, and the same cast type. Preferably in certain embodiments, the first PSSCH retransmission, the initial/new PSSCH transmission, the second PSSCH retransmission are performed by the TX UE in a same sidelink resource pool. Preferably in certain embodiments, the sidelink resource pool is a shared SL PRS resource pool.

Preferably in certain embodiments, the another SCI may schedule the initial/new PSSCH transmission with SL PRS multiplexing. The another SCI may comprise SCI format 2-D.

Preferably or alternatively in certain embodiments, the another SCI may schedule the initial/new PSSCH transmission without SL PRS multiplexing. The another SCI may comprise any of SCI format 1-A, 2-A, 2-B, 2-C.

Preferably in certain embodiments, the first SCI may schedule the first PSSCH retransmission and a first SL PRS transmission in the first slot. Preferably in certain embodiments, the first SCI may comprise SCI format 2-D. Preferably in certain embodiments, the SCI format 2-D may comprise the "SL PRS request" field. Preferably in certain embodiments, any of SCI format 1-A, 2-A, 2-B, or 2-C may not comprise the "SL PRS request" field. Preferably in certain embodiments, the first SL PRS transmission and the first PSSCH retransmission are associated with the same (Layer-1 or Layer-2) source ID, the same (Layer-1 or Layer-2) destination ID, and the same cast type.

Preferably or alternatively in certain embodiments, the first SCI may schedule the first PSSCH retransmission and not schedule SL PRS transmission in the first slot. Preferably in certain embodiments, the first SCI may not comprise/indicate SL PRS resource-related information, e.g., SL PRS resource ID indicator. Preferably in certain embodiments, the first SCI may comprise any of SCI format 1-A, 2-A, 2-B, 2-C. Preferably in certain embodiments, any of SCI format 1-A, 2-A, 2-B, or 2-C may comprise the "SL PRS request" field if configuration of the sidelink resource pool comprises SL PRS-related configuration, e.g., SL PRS resource ID configuration. Preferably in certain embodiments, if configuration of the sidelink resource pool does not comprise SL PRS-related configuration, any of SCI format 1-A, 2-A, 2-B, or 2-C may not comprise the "SL PRS request" field. Preferably or alternatively in certain embodiments, the first SCI may comprise/indicate SL PRS resource-related information, e.g., SL PRS resource ID indicator. Preferably in certain embodiments, the first SCI may comprise SCI format 2-D. Preferably in certain embodiments, the SCI format 2-D may comprise the "SL PRS request" field. Preferably in certain embodiments, the SCI format 2-D may indicate no SL PRS transmission in the first slot. Preferably in certain embodiments, the SCI format 2-D may indicate a specific SL PRS resource ID which corresponds to no SL PRS transmission or disable SL PRS transmission. Preferably in certain embodiments, the specific SL PRS resource ID may be specified or (pre-)configured. Preferably in certain embodiments, one or more fields of the SCI format 2-D may indicate one or more specific values for indicating no SL PRS transmission or disable SL PRS transmission.

For instance as shown in FIG. 5, the TX UE may perform the PSSCH 1 and PSSCH 2 transmission with SCI not indicating SL PRS request. The TX UE may determine to request SL PRS from other UE(s)/destination(s) in a first timing later than slot $n_2$ and earlier than slot $n_3$. The TX UE may perform the PSSCH 3 transmission with SCI indicating SL PRS request. The TX UE may cancel the SL PRS request in response to transmission of the SCI indicating SL PRS request. The TX UE may perform the PSSCH 4-6 transmission with SCI not indicating SL PRS request.

Preferably in certain embodiments, based on method/concept C, a text proposal 3 (bolded and underlined) may be provided as below.

For each sidelink grant that is not on SL-PRS dedicated resource pool, the Sidelink HARQ Entity shall:

1> if the MAC entity determines that the sidelink grant is used for initial transmission as specified in clause 5.22.1.1; or 1> if the sidelink grant is a configured sidelink grant and no MAC PDU has been obtained in an sl-PeriodCG of the configured sidelink grant; or 1> if the sidelink grant is a dynamic sidelink grant or selected sidelink grant and no MAC PDU has been obtained in the previous sidelink grant when PSCCH duration(s) and 2$^{nd}$ stage SCI on PSSCH of the previous sidelink grant is not in SL DRX Active time as specified in clause 5.28.3 of any destination that has data to be sent:

NOTE 1: Void.

2> (re-)associate a Sidelink process to this grant, and for the associated Sidelink process;

2> if all PSCCH duration(s) and PSSCH duration(s) for initial transmission of a MAC PDU of the dynamic sidelink grant or the configured sidelink grant is not in SL DRX Active time as specified in clause 5.28.3 of the destination that has data to be sent:

3> ignore the sidelink grant.

NOTE 1A: The Sidelink HARQ Entity will associate the selected sidelink grant to the Sidelink process determined by the MAC entity.

2> else:

3> obtain the MAC PDU to transmit from the Multiplexing and assembly entity, if any;

3> if a MAC PDU to transmit has been obtained:

4> if a HARQ Process ID has been set for the sidelink grant:

5> (re-)associate the HARQ Process ID corresponding to the sidelink grant to the Sidelink process.

NOTE 1a: There is one-to-one mapping between a HARQ Process ID and a Sidelink process in the MAC entity configured with Sidelink resource allocation mode 1.

4> determines Sidelink transmission information of the TB for the source and destination pair of the MAC PDU as follows:

5> set the Source Layer-1 ID to the 8 LSB of the Source Layer-2 ID of the MAC PDU;

5> set the Destination Layer-1 ID to the 16 LSB of the Destination Layer-2 ID of the MAC PDU;

5> (re-)associate the Sidelink process to a Sidelink process ID;

5> set the Redundancy version to the selected value.

5> if the sidelink grant is associated with request from the higher layer for triggering the SL-PRS transmission of the peer UE identified by the Destination layer-2 ID;

6> set the SL-PRS request to request.

5> set the SL-PRS resource ID to [the value of the field], if available, within Sidelink transmission information.

Editor's NOTE: FFS how the SL-PRS resource ID is determined and its impacts to MAC.

4> deliver the MAC PDU, SL-PRS, if available, the sidelink grant and the Sidelink transmission information of the TB to the associated Sidelink process;

4> instruct the associated Sidelink process to trigger a new transmission.

3> else;

4> flush the HARQ buffer of the associated Sidelink process.

1> else (i.e., retransmission):

2> if the HARQ Process ID corresponding to the sidelink grant received on PDCCH, the configured sidelink grant or the selected sidelink grant is associated to a Sidelink process of which HARQ buffer is empty; or 2> if the HARQ Process ID corresponding to the sidelink grant received on PDCCH is not associated to any Sidelink process; or 2> if PSCCH duration(s) and PSSCH duration(s) for one or more retransmissions of a MAC PDU of the dynamic sidelink grant or the configured sidelink grant is not in SL DRX Active time as specified in clause 5.28.3 of the destination that has data to be sent:

3> ignore the sidelink grant.

2> else:

3> if the sidelink grant is associated with request from the higher laver for triggering the SL-PRS transmission of the peer UE Identified by the Destination layer-2 ID: (Addition 1)

4> set the SL-PRS request to request.

3> If the request is received (from the higher laver) (and [not cancelled/pending]) for triggering the SL-PRS transmission of the peer UE Identified by the Destination layer-2 ID: (Addition 2)

4> set the SL-PRS request to request.

3> identify the Sidelink process associated with this grant, and for the associated Sidelink process:

4> deliver the sidelink grant of the MAC PDU and SL-PRS, if available, to the associated Sidelink process;

4> instruct the associated Sidelink process to trigger a retransmission.

Preferably or alternatively in certain embodiments, Concept C may allow the TX UE to start to request SL PRS from other UE(s)/destination(s) in a third SCI scheduling a first SL PRS retransmission in a first slot. Preferably in certain embodiments, the TX UE may transmit the third SCI and the first SL PRS retransmission to the other UE(s)/destination(s) in the first slot. Preferably in certain embodiments, the TX UE may set a field in the third SCI for indicating SL PRS request, e.g., set "SL PRS request" field as request/1.

Preferably in certain embodiments, the TX UE may not request SL PRS from the other UE(s)/destination(s) via another SCI scheduling an initial/new SL PRS transmission. The TX UE may transmit the another SCI and the initial/new SL PRS transmission before the TX UE performs the first SL PRS retransmission. The initial/new SL PRS transmission and the first SL PRS retransmission are associated with a same (layer-1 or layer-2) destination ID, same (layer-1 or layer-2) source ID, same cast type, same priority value, and/or same SL PRS triggering.

Preferably in certain embodiments, the TX UE may determine to request SL PRS from other UE(s)/destination(s) in a first timing later than the initial/new SL PRS transmission.

Preferably in certain embodiments, Concept C also allows that the TX UE may not request SL PRS from other UE(s)/destination(s) in a fourth SCI scheduling a second SL PRS retransmission in a second slot, wherein the second SL PRS retransmission is performed after the first SL PRS retransmission and wherein the second SL PRS retransmission and the first SL PRS retransmission are associated with a same (layer-1 or layer-2) destination ID, a same (layer-1 or layer-2) source ID, same cast type, same priority value, and/or same SL PRS triggering. Preferably in certain embodiments, the TX UE may cancel the SL PRS requesting in a second timing before the second SL PRS retransmission or the second slot. Preferably in certain embodiments, the TX UE may cancel the SL PRS requesting in the second timing after the first SL PRS retransmission. Preferably in certain embodiments, the TX UE may cancel the SL PRS requesting in response to the transmission of the third SCI or the first SL PRS retransmission.

Preferably in certain embodiments, the first SL PRS retransmission, the initial/new SL PRS transmission, and the second SL PRS retransmission are performed by the TX UE in a same sidelink resource pool. Preferably in certain embodiments, the sidelink resource pool is a dedicated SL PRS resource pool.

Preferably in certain embodiments, the another SCI may schedule the initial/new SL PRS transmission. The another SCI may comprise SCI format 1-B.

Preferably in certain embodiments, the third SCI may schedule the first SL PRS retransmission in the first slot. Preferably in certain embodiments, the third SCI may comprise SCI format 1-B. Preferably in certain embodiments, the SCI format 1-B may comprise the "SL PRS request" field. Preferably in certain embodiments, the SCI format 1-B may indicate no SL PRS transmission in the first slot.

Preferably in certain embodiments, the third SCI may not schedule the first SL PRS retransmission in the first slot. The SCI format 1-B may indicate a specific SL PRS resource ID which corresponds to no SL PRS transmission or disable SL PRS transmission. Preferably in certain embodiments, the specific SL PRS resource ID may be specified or (pre-) configured. Preferably in certain embodiments, one or more fields of the SCI format 1-B may indicate one or more specific values for indicating no SL PRS transmission or disable SL PRS transmission.

Preferably in certain embodiments, based on the method/concept C, a text proposal 4 (bolded and underlined) may be provided as below.

5.22.1.xx SL-PRS Transmission on SL-PRS Dedicated Resource Pool

The MAC entity shall for the SCI of each new transmission of SL-PRS:

1> set the Destination ID to the Destination layer-2 ID corresponding to the SL-PRS transmission;

1> if [12bitSourceID] is configured:

2> set the Source ID to the 12 [most/least significant bits] of the Source layer-2 ID corresponding to the SL-PRS transmission;

1> else if [24bitSourceID] is configured:

2> set the Source ID to the Source layer-2 ID corresponding to the SL-PRS transmission;

1> set the cast type indicator to one of broadcast, groupcast and unicast as selected in clause 5.22.1.2.1.2;

1> set the SL-PRS priority as the value indicated by upper layer;

1> set the SL-PRS resource ID;

Editor's NOTE: FFS how the SL-PRS resource ID is determined and its impacts to transmission on SL-PRS dedicated resource pool.

1> if the higher layer triggers SL-PRS transmission to the peer UE identified by the Destination layer-2 ID:

2> set the SL-PRS request to request.

Editor's NOTE: FFS when source ID length configured as 12 bit. whether it is the MSB or LSB of the source layer-2 ID of the UE.

The MAC entity shall, for each retransmission of SL-PRS, adopt the same SCI fields, except SL-PRS resource ID field and SL-PRS request field, as the SCI fields for the corresponding new transmission. (Addition 1)

The MAC entity shall for the SCI of each retransmission of SL-PRS: (Addition 2)

1> set the SL-PRS resource ID;

1> If the higher laver triggers SL-PRS transmission to the peer UE Identified by the Destination layer-2 ID;

2> set the SL-PRS request to request.

1> adopt the Destination ID, the Source ID, the cast the indicator, the SL-PRS priority fields the same as the SCI fields for the corresponding new transmission.

Note that any of the above and herein methods, alternatives, concepts, examples, and embodiments may be combined, in whole or in part, or applied simultaneously or separately.

For the methods, alternatives, concepts, examples, and embodiments detailed above and herein, the following aspects and embodiments are possible.

Preferably in certain embodiments, the SL PRS may be SL Channel State Information Reference Signal (CSI-RS).

Preferably in certain embodiments, the SL PRS is not SL CSI-RS.

Preferably in certain embodiments, the SL PRS may be represented/replaced as a sidelink reference signal.

Preferably in certain embodiments, the sidelink reference signal may be applied/utilized for (absolute and/or relative) positioning and/or ranging.

Preferably in certain embodiments, the sidelink reference signal may be applied/utilized for any of time-based positioning/ranging methods and/or angle-based positioning/ranging methods. Preferably in certain embodiments, the sidelink reference signal may be applied/utilized for any of TDoA, RTT-based positioning/ranging, AoA, AoD, or carrier phase measurement based positioning.

Preferably in certain embodiments, the sidelink reference signal may be SL beam management RS. Preferably in certain embodiments, the sidelink reference signal may be SL CSI-RS (for beam management), which is not combined within a PSSCH (bandwidth) in frequency domain. Preferably in certain embodiments, the sidelink reference signal may require large bandwidth. Preferably in certain embodiments, the sidelink reference signal may be utilized for (High-Resolution) localization, sensing, or imaging. Preferably in certain embodiments, the sidelink reference signal may be utilized for beam management (e.g., in FR2).

Preferably in certain embodiments, any of the above concepts, methods, alternatives and embodiments for SL PRS may be applied for other reference signals (e.g., reference signals designed/introduced in future 5G, 6G, etc.).

Preferably in certain embodiments, any of the above concepts, methods, alternatives and embodiments for SL PRS may be applied for SL CSI-RS (for beam management).

Preferably in certain embodiments, any of the above concepts, methods, alternatives and embodiments for SL PRS may be applied for reference signal for (High-Resolution) localization (e.g., reference signal designed/introduced in future 5G, 6G, etc.).

Preferably in certain embodiments, any of the above concepts, methods, alternatives and embodiments for SL PRS may be applied for reference signal for (High-Resolution) sensing (e.g., reference signal designed/introduced in future 5G, 6G, etc.).

Preferably in certain embodiments, any of the above concepts, methods, alternatives and embodiments for SL PRS may be applied for reference signal for (High-resolution) imaging (e.g., reference signal designed/introduced in future 5G, 6G, etc.).

Preferably in certain embodiments, the shared SL PRS resource pool is utilized/configured for PSSCH transmission/reception and/or SL PRS transmission/reception. Preferably in certain embodiments, shared SL PRS resource pool may be a sidelink resource pool for PSSCH transmission/reception and enabled/configured/supported for SL PRS transmission/reception/measurement.

Preferably in certain embodiments, sidelink communication resource pool may be a sidelink resource pool for PSSCH transmission/reception and not enabled/configured/supported for SL PRS transmission/reception/measurement.

Preferably in certain embodiments, the dedicated SL PRS resource pool may be a sidelink resource pool comprising/providing at least SL PRS resources and/or sidelink control resources. Preferably in certain embodiments, the dedicated SL PRS resource pool does not comprise sidelink data resources (i.e., does not comprise PSSCH resources). Preferably in certain embodiments, the dedicated SL PRS resource pool for SL PRS does not comprise sidelink feedback resources.

Preferably in certain embodiments, the sidelink data packet may comprise or mean a (sidelink) Transport Block (TB) or a (sidelink) MAC PDU. The (sidelink) MAC PDU may comprise a MAC subheader, MAC CE(s) if available, and/or sidelink data from sidelink logical channel(s) if available.

Preferably in certain embodiments, PSSCH may mean sidelink data transmission.

Preferably in certain embodiments, PSFCH may mean sidelink feedback transmission.

Preferably in certain embodiments, PSCCH may mean sidelink control transmission.

Preferably in certain embodiments, the SCI/PSCCH associated with SL PRS may include/comprise information for scheduling/indicating/allocating SL PRS resource.

Preferably in certain embodiments, sidelink control information in shared SL PRS resource pool or sidelink communication resource pool may be transmitted/delivered via 1st stage SCI and 2nd stage SCI. Preferably in certain embodiments, the sidelink control information in shared SL PRS resource pool or sidelink communication resource pool may be delivered at least in PSCCH. Preferably in certain embodiments, the sidelink control information in shared SL PRS resource pool or sidelink communication resource pool may comprise 1st stage SCI. Preferably in certain embodiments, the 1st stage SCI may be transmitted via PSCCH. Preferably in certain embodiments, the sidelink control information in shared SL PRS resource pool or sidelink communication resource pool may comprise 2nd stage SCI. Preferably in certain embodiments, the 2nd stage SCI may be transmitted via multiplexed with PSSCH. Preferably in certain embodiments, the SCI format 1 or SCI format 1-X is 1st stage SCI. Preferably in certain embodiments, the SCI format 2-A or 2-B or 2-C or 2-D or 2-X is a 2nd stage SCI.

Preferably in certain embodiments, the SCI format 2-A, 2-B, 2-C does not comprise SL PRS resource-related information/fields.

Preferably in certain embodiments, the SCI format 2-D comprises SL PRS resource-related information/fields.

Preferably in certain embodiments, for transmitting PSSCH in a slot or subslot, the TX UE needs to transmit SCI in the slot or the subslot for scheduling the PSSCH.

Preferably in certain embodiments, for transmitting SL PRS in a slot or subslot, the TX UE needs to transmit SCI in the slot or the subslot for scheduling the SL PRS.

Preferably in certain embodiments, the slot may mean a sidelink slot. Preferably in certain embodiments, the slot may be represented/replaced as a Transmission Time Interval (TTI).

Preferably in certain embodiments, the sidelink slot may mean a slot for sidelink. Preferably in certain embodiments, a TTI may be a subframe (for sidelink) or slot (for sidelink) or sub-slot (for sidelink). Preferably in certain embodiments, a TTI comprises multiple symbols, e.g., 12 or 14 symbols. Preferably in certain embodiments, a TTI may be a slot (fully/partially) comprising sidelink symbols. Preferably in certain embodiments, a TTI may mean a transmission time interval for a sidelink (data) transmission. Preferably in certain embodiments, a sidelink slot or a slot for sidelink may contain all Orthogonal Frequency-Division Multiplexing (OFDM) symbols available for sidelink transmission. Preferably in certain embodiments, a sidelink slot or a slot for sidelink may contain a consecutive number of symbols available for sidelink transmission. Preferably in certain embodiments, a sidelink slot or a slot for sidelink means that a slot is included/comprised in a sidelink resource pool.

Preferably in certain embodiments, the symbol may mean a symbol indicated/configured for sidelink.

Preferably in certain embodiments, the slot may mean/comprise a sidelink slot associated with the (sidelink) resource pool. Preferably in certain embodiments, the slot may not mean/comprise a sidelink slot associated with other (sidelink) resource pool.

Preferably in certain embodiments, a sub-channel is a unit for sidelink resource allocation/scheduling (for PSSCH). Preferably in certain embodiments, a sub-channel may comprise multiple contiguous PRBs in frequency domain. Preferably in certain embodiments, the number of PRBs for each sub-channel may be (pre-)configured for a sidelink resource pool. Preferably in certain embodiments, a sidelink resource pool (pre-)configuration may indicate/configure the number of PRBs for each sub-channel. Preferably in certain embodiments, the number of PRBs for each sub-channel may be any of 10, 12, 15, 20, 25, 50, 75, 100. Preferably in certain embodiments, a sub-channel may be represented as a unit for sidelink resource allocation/scheduling. Preferably in certain embodiments, a sub-channel may mean a set of consecutive PRBs in frequency domain. Preferably in certain embodiments, a sub-channel may mean a set of consecutive resource elements in frequency domain.

Preferably in certain embodiments, the first UE may have/maintain/establish multiple sidelink links/connections on PC5 interface. For different sidelink links/connections, the first UE may perform sidelink transmission/reception to/from different paired UE(s).

Preferably in certain embodiments, the first UE may have/maintain/establish a first sidelink link/connection and a second sidelink link/connection. The paired UE of the first sidelink link/connection may be different from the paired UE of the second sidelink link/connection. Preferably in certain embodiments, the sidelink logical channel(s) associated with (the paired UE of) the first sidelink link/connection are separate/independent from the sidelink logical channel(s) associated with (the paired UE of) the second sidelink link/connection.

Preferably in certain embodiments, the UE may be/mean/comprise/replace a device.

Preferably in certain embodiments, the sidelink transmission/reception may be UE-to-UE transmission/reception. Preferably in certain embodiments, the sidelink transmission/reception may be device-to-device transmission/reception. Preferably in certain embodiments, the sidelink transmission/reception may be Vehicle-to-Everything (V2X) transmission/reception. Preferably in certain embodiments, the sidelink transmission/reception may be Pedestrian-to-Everything (P2X) transmission/reception. Preferably in certain embodiments, the sidelink transmission/reception may be on PC5 interface.

Preferably in certain embodiments, the PC5 interface may be a wireless interface for communication between device and device. Preferably in certain embodiments, the PC5 interface may be a wireless interface for communication between devices. Preferably in certain embodiments, the PC5 interface may be a wireless interface for communication between UEs. Preferably in certain embodiments, the PC5 interface may be a wireless interface for V2X or P2X communication. Preferably in certain embodiments, the Uu interface may be a wireless interface for communication between a network node and a device. Preferably in certain embodiments, the Uu interface may be a wireless interface for communication between a network node and a UE.

Preferably in certain embodiments, the first UE may be a first device. Preferably in certain embodiments, the first UE may be a vehicle UE. Preferably in certain embodiments, the first UE may be a V2X UE.

Preferably in certain embodiments, the second UE may be a second device. Preferably in certain embodiments, the second UE may be a vehicle UE. Preferably in certain embodiments, the second device may be a V2X UE.

Preferably in certain embodiments, the first UE and the second device are different devices.

Various examples and embodiments of the present invention are described below.

Figure 7:
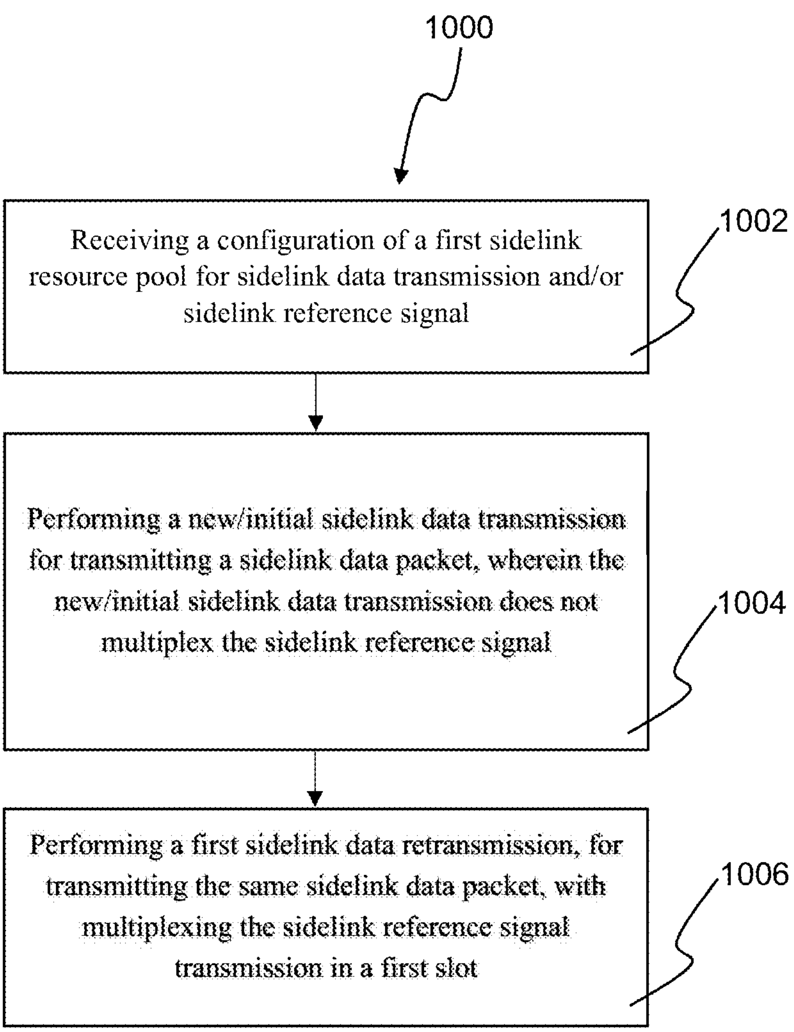
FIG. 7 is a flow diagram of a method of a first device comprising receiving a configuration of a first sidelink resource pool for sidelink data transmission and/or sidelink reference signal, performing a new/initial sidelink data transmission for transmitting a sidelink data packet, and performing a first sidelink data retransmission, for transmitting the same sidelink data packet, with multiplexing the sidelink reference signal transmission in a first slot, in accordance with embodiments of the present invention.

Referring to FIG. 7, with this and other concepts, systems, and methods of the present invention, a method 1000 for a first device in a wireless communication system comprises receiving a configuration of a first sidelink resource pool for sidelink data transmission and/or sidelink reference signal (step 1002), performing a new/initial sidelink data transmission for transmitting a sidelink data packet, wherein the new/initial sidelink data transmission does not multiplex the sidelink reference signal (step 1004), and performing a first sidelink data retransmission, for transmitting the same sidelink data packet, with multiplexing the sidelink reference signal transmission in a first slot (step 1006).

In various embodiments, the first device triggers or is triggered for the sidelink reference signal transmission in a first timing later than the initial/new sidelink data transmission.

In various embodiments, the first device performs a second sidelink data retransmission in a second slot for transmitting the same sidelink data packet, wherein the second sidelink data retransmission does not multiplex the sidelink reference signal, wherein the second sidelink data retransmission is performed after the first sidelink data retransmission.

In various embodiments, the first device cancels the triggering of the sidelink reference signal transmission in a second timing before the second sidelink data retransmission or the second slot, or the first device cancels the triggering of the sidelink reference signal transmission in response to the first sidelink data transmission with multiplexing the sidelink reference signal transmission, or the first device cancels the triggering of the sidelink reference signal transmission in response to the first device performing the sidelink reference signal transmission for a first number of times.

In various embodiments, the second sidelink data retransmission is not able to multiplex the sidelink reference signal transmission, e.g., due to no sufficient symbols for the sidelink reference signal transmission in the second sidelink data retransmission, or due to there being sidelink feedback resources in the second slot.

In various embodiments, the new/initial sidelink data transmission, the first sidelink data retransmission, and/or the second sidelink data retransmission are performed in the sidelink resource pool.

Referring back to FIGS. 3 and 4, in one or more embodiments from the perspective of a first device in a wireless communication system, the device 300 includes a program code 312 stored in memory 310 of the transmitter. The CPU 308 could execute program code 312 to: (i) receive a configuration of a first sidelink resource pool for sidelink data transmission and/or sidelink reference signal; (ii) perform a new/initial sidelink data transmission for transmitting a sidelink data packet, wherein the new/initial sidelink data transmission does not multiplex the sidelink reference signal; and (iii) perform a first sidelink data retransmission, for transmitting the same sidelink data packet, with multiplexing the sidelink reference signal transmission in a first slot. Moreover, the CPU 308 can execute the program code 312 to perform all of the described actions, steps, and methods described above, below, or otherwise herein.

Figure 8:
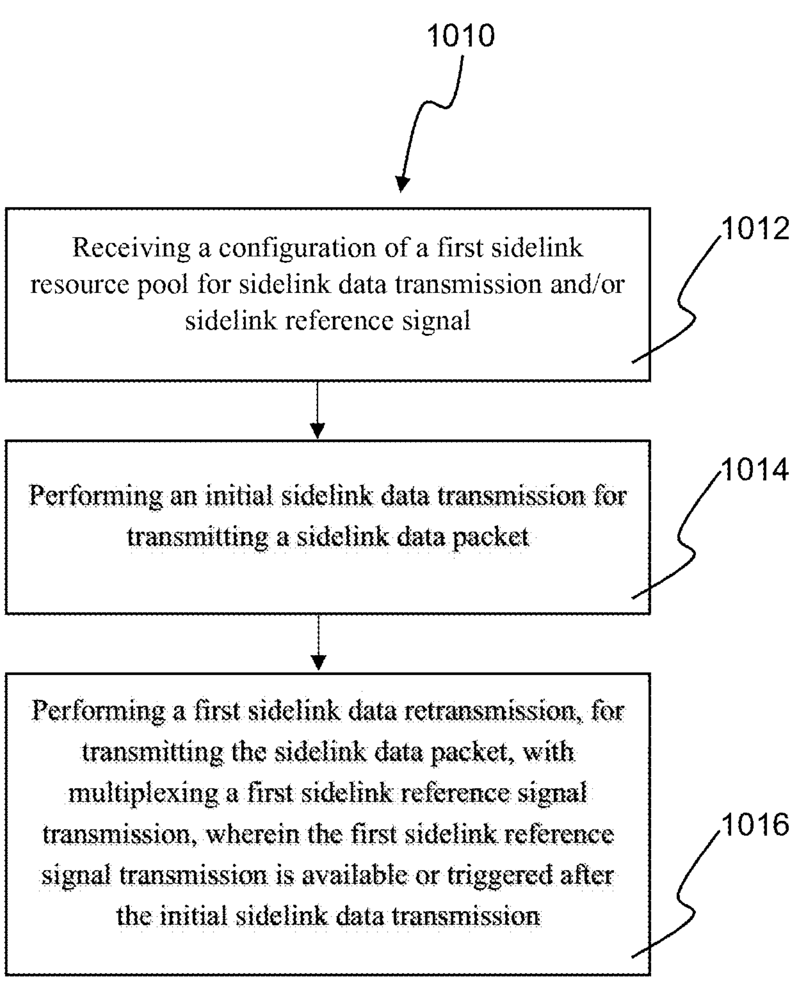
FIG. 8 is a flow diagram of a method of a first device comprising receiving a configuration of a first sidelink resource pool for sidelink data transmission and/or sidelink reference signal, performing an initial sidelink data transmission for transmitting a sidelink data packet, and performing a first sidelink data retransmission, for transmitting the sidelink data packet, with multiplexing a first sidelink reference signal transmission, in accordance with embodiments of the present invention.

Referring to FIG. 8, with this and other concepts, systems, and methods of the present invention, a method 1010 for a first device in a wireless communication system comprises receiving a configuration of a first sidelink resource pool for sidelink data transmission and/or sidelink reference signal (step 1012), performing an initial sidelink data transmission for transmitting a sidelink data packet (step 1014), and performing a first sidelink data retransmission, for transmitting the sidelink data packet, with multiplexing a first sidelink reference signal transmission, wherein the first sidelink reference signal transmission is available or triggered after the initial sidelink data transmission (step 1016).

In various embodiments, the initial sidelink data transmission does not multiplex the first sidelink reference signal transmission.

In various embodiments, the first sidelink reference signal transmission is available or triggered in a first timing later than the initial sidelink data transmission, and/or the first sidelink reference signal transmission is available or triggered in the first timing before the first sidelink data retransmission.

In various embodiments, the initial sidelink data transmission and the first sidelink data retransmission are performed in the first sidelink resource pool.

In various embodiments, the first sidelink reference signal transmission and the first sidelink data retransmission are associated with any of a same (Layer-1 or Layer-2) destination Identity (ID), a same (Layer-1 or Layer-2) source ID, and/or a same cast type, and/or the first sidelink reference signal transmission and the sidelink data packet are associated with any of the same (Layer-1 or Layer-2) destination ID, the same (Layer-1 or Layer-2) source ID, and/or the same cast type.

In various embodiments, the initial sidelink data transmission means an initial PSSCH transmission, and/or the first sidelink data retransmission means a first PSSCH retransmission, and/or the sidelink reference signal means sidelink positioning reference signal, and/or the sidelink reference signal means sidelink CSI reference signal for beam management, and/or the sidelink reference signal is utilized for any of positioning, ranging, beam management, high-resolution localization, sensing, or imaging, and/or the first sidelink reference signal means a first sidelink positioning reference signal, and/or the first sidelink reference signal means a first sidelink CSI reference signal for beam management, and/or the first sidelink reference signal is utilized for any of positioning, ranging, beam management, high-resolution localization, sensing, or imaging.

In various embodiments, the first device performs a second sidelink data retransmission for transmitting the sidelink data packet in the first sidelink resource pool, the second sidelink data retransmission is performed after the first sidelink data retransmission, and the second sidelink data retransmission does not multiplex the first sidelink reference signal.

In various embodiments, the first device cancels the availability or triggering of the first sidelink reference signal transmission before the second sidelink data retransmission, or the first device cancels the availability or triggering of the first sidelink reference signal transmission in response to multiplexing the first sidelink reference signal transmission with the first sidelink data retransmission, or the first device cancels the availability or triggering of the first sidelink reference signal transmission in response to the first device performing the first sidelink reference signal transmission for a first number of times.

In various embodiments, the second sidelink data retransmission is not able to multiplex the first sidelink reference signal transmission due to no sufficient symbols for multiplexing the first sidelink reference signal transmission in the second sidelink data retransmission.

Referring back to FIGS. 3 and 4, in one or more embodiments from the perspective of a first device in a wireless communication system, the device 300 includes a program code 312 stored in memory 310 of the transmitter. The CPU 308 could execute program code 312 to: (i) receive a configuration of a first sidelink resource pool for sidelink data transmission and/or sidelink reference signal; (ii) perform an initial sidelink data transmission for transmitting a sidelink data packet; and (iii) perform a first sidelink data retransmission, for transmitting the sidelink data packet, with multiplexing a first sidelink reference signal transmission, wherein the first sidelink reference signal transmission is available or triggered after the initial sidelink data transmission. Moreover, the CPU 308 can execute the program code 312 to perform all of the described actions, steps, and methods described above, below, or otherwise herein.

Figure 9:
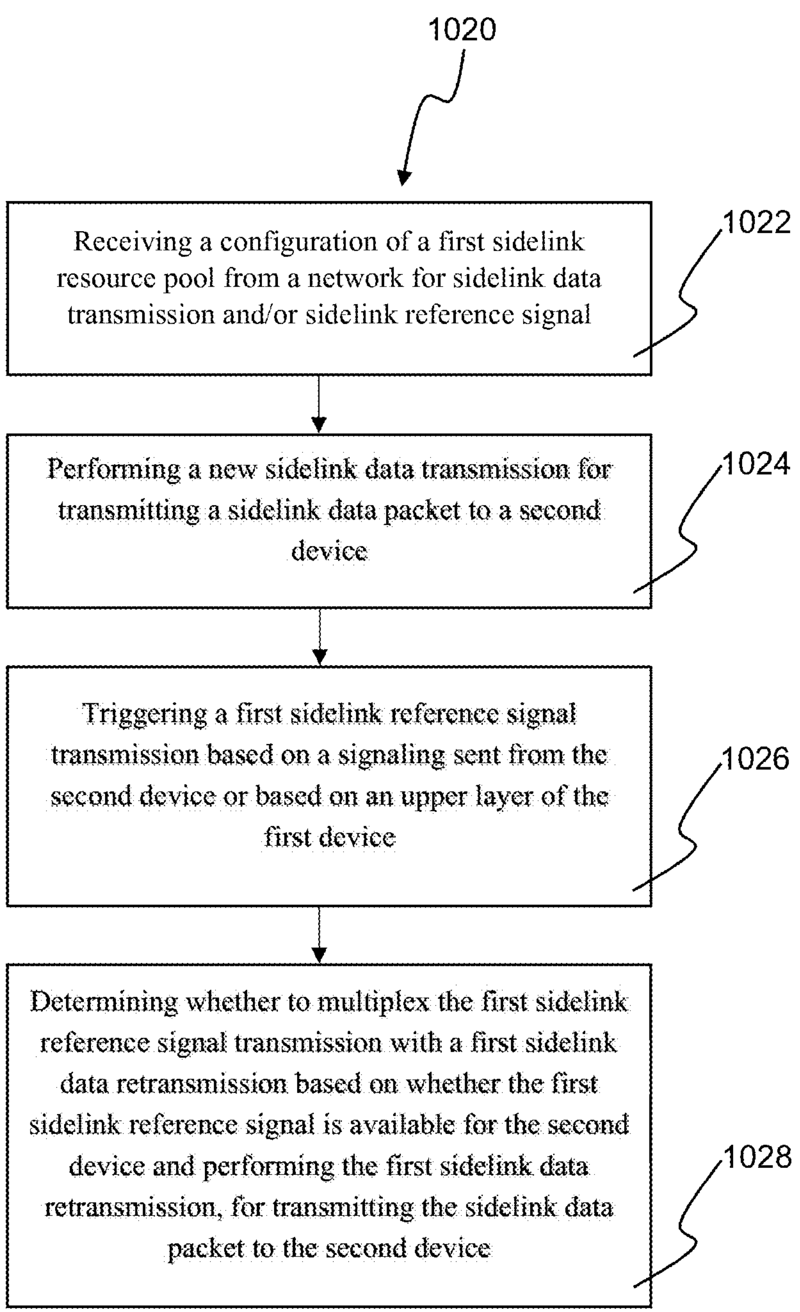
FIG. 9 is a flow diagram of a method of a first device comprising receiving a configuration of a first sidelink resource pool from a network for sidelink data transmission and/or sidelink reference signal, performing a new sidelink data transmission for transmitting a sidelink data packet to a second device, triggering a first sidelink reference signal transmission based on a signaling sent from the second device or based on an upper layer of the first device, and determining whether to multiplex the first sidelink reference signal transmission with a first sidelink data retransmission based on whether the first sidelink reference signal is available for the second device and performing the first sidelink data retransmission, for transmitting the sidelink data packet to the second device, in accordance with embodiments of the present invention.

Referring to FIG. 9, with this and other concepts, systems, and methods of the present invention, a method 1020 for a first device in a wireless communication system comprises receiving a configuration of a first sidelink resource pool from a network for sidelink data transmission and/or sidelink reference signal (step 1022), performing a new sidelink data transmission for transmitting a sidelink data packet to a second device (step 1024), triggering a first sidelink reference signal transmission based on a signaling sent from the second device or based on an upper layer of the first device (step 1026), and determining whether to multiplex the first sidelink reference signal transmission with a first sidelink data retransmission based on whether the first sidelink reference signal is available for the second device and performing the first sidelink data retransmission, for transmitting the sidelink data packet to the second device (step 1028).

In various embodiments, the method further comprises multiplexing the first sidelink reference signal transmission with the first sidelink data retransmission if the first sidelink reference signal is available for the second device, and/or not multiplexing the first sidelink reference signal transmission with the first sidelink data retransmission if the first sidelink reference signal is not available for the second device.

In various embodiments, the first sidelink reference signal transmission is available or triggered in a first timing later than the new sidelink data transmission, and/or the first sidelink reference signal transmission is available or triggered in the first timing before the first sidelink data retransmission.

In various embodiments, the new sidelink data transmission and the first sidelink data retransmission are performed in the first sidelink resource pool.

In various embodiments, the first sidelink reference signal transmission and the first sidelink data retransmission are associated with any of a same (Layer-1 or Layer-2) destination Identity (ID), a same (Layer-1 or Layer-2) source ID, and/or a same cast type, and/or the first sidelink reference signal transmission and the sidelink data packet are associated with any of the same (Layer-1 or Layer-2) destination ID, the same (Layer-1 or Layer-2) source ID, and/or the same cast type.

In various embodiments, the new sidelink data transmission means a new or initial PSSCH transmission, and/or the first sidelink data retransmission means a first PSSCH retransmission, and/or the sidelink reference signal means sidelink positioning reference signal, and/or the sidelink reference signal means sidelink CSI reference signal for beam management, and/or the sidelink reference signal is utilized for any of positioning, ranging, beam management, high-resolution localization, sensing, or imaging, and/or the first sidelink reference signal means a first sidelink positioning reference signal, and/or the first sidelink reference signal means a first sidelink CSI reference signal for beam management, and/or the first sidelink reference signal is utilized for any of positioning, ranging, beam management, high-resolution localization, sensing, or imaging.

Referring back to FIGS. 3 and 4, in one or more embodiments from the perspective of a first device in a wireless communication system, the device 300 includes a program code 312 stored in memory 310 of the transmitter. The CPU 308 could execute program code 312 to: (i) receive a configuration of a first sidelink resource pool from a network for sidelink data transmission and/or sidelink reference signal; (ii) perform a new sidelink data transmission for transmitting a sidelink data packet to a second device; (iii) trigger a first sidelink reference signal transmission based on a signaling sent from the second device or based on an upper layer of the first device; and (iv) determine whether to multiplex the first sidelink reference signal transmission with a first sidelink data retransmission based on whether the first sidelink reference signal is available for the second device and performing the first sidelink data retransmission, for transmitting the sidelink data packet to the second device. Moreover, the CPU 308 can execute the program code 312 to perform all of the described actions, steps, and methods described above, below, or otherwise herein.

Any combination of the above or herein concepts or teachings can be jointly combined, in whole or in part, or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of a first device, comprising:

receiving a configuration of a first sidelink resource pool for sidelink data transmission and/or sidelink reference signal, wherein the sidelink reference signal means sidelink positioning reference signal or sidelink Channel State Information (CSI) reference signal for beam management, and/or the sidelink reference signal is utilized for any of positioning, ranging, beam management, high-resolution localization, sensing, or imaging;

transmitting a first Sidelink Control Information (SCI) and an initial sidelink data transmission for transmitting a sidelink data packet, wherein the first SCI is used for decoding of the initial sidelink data transmission and wherein the first SCI does not comprise sidelink reference signal resource-related information; and transmitting a second SCI and a first sidelink data retransmission, for transmitting the sidelink data packet, with multiplexing a transmission of a first sidelink reference signal, wherein:

the first sidelink reference signal means a first sidelink positioning reference signal or a first sidelink CSI reference signal for beam management, and/or the first sidelink reference signal is utilized for any of positioning, ranging, beam management, high-resolution localization, sensing, or imaging, the first sidelink reference signal is available or triggered, after the initial sidelink data transmission, for transmission, the second SCI is used for decoding of the first sidelink data retransmission and scheduling of the first sidelink reference signal, the second SCI comprises sidelink reference signal resource-related information for the transmission of the first sidelink reference signal, and the first sidelink data retransmission and the transmission of the first sidelink reference signal are multiplexed in a same slot with a same frequency domain resource.

2. The method of claim 1, wherein the initial sidelink data transmission does not multiplex the transmission of the first sidelink reference signal.

3. The method of claim 1, wherein:

the first sidelink reference signal is available or triggered, in a first timing later than the initial sidelink data transmission, for transmission, and/or the first sidelink reference signal is available or triggered, in the first timing before the first sidelink data retransmission, for transmission.

4. The method of claim 1, wherein the initial sidelink data transmission and the first sidelink data retransmission are transmitted in the first sidelink resource pool.

5. The method of claim 1, wherein:

the transmission of the first sidelink reference signal and the first sidelink data retransmission are associated with any of a same destination Identity (ID), a same source ID, and/or a same cast type, and/or the transmission of the first sidelink reference signal and the sidelink data packet are associated with any of the same destination ID, the same source ID, and/or the same cast type.

6. The method of claim 1, wherein:

the initial sidelink data transmission means an initial Physical Sidelink Shared Channel (PSSCH) transmission, and/or the first sidelink data retransmission means a first PSSCH retransmission, and/or the sidelink reference signal means sidelink positioning reference signal, and/or the sidelink reference signal means sidelink Channel State Information (CSI) reference signal for beam management, and/or the sidelink reference signal is utilized for any of positioning, ranging, beam management, high-resolution localization, sensing, or imaging, and/or the first sidelink reference signal means a first sidelink positioning reference signal, and/or the first sidelink reference signal means a first sidelink CSI reference signal for beam management, and/or the first sidelink reference signal is utilized for any of positioning, ranging, beam management, high-resolution localization, sensing, or imaging.

7. The method of claim 1, wherein:

the first device transmits a second sidelink data retransmission for transmitting the sidelink data packet in the first sidelink resource pool, the second sidelink data retransmission is transmitted after the first sidelink data retransmission, and the second sidelink data retransmission does not multiplex the transmission of the first sidelink reference signal.

8. The method of claim 7, wherein:

the first device cancels the availability or triggering for transmission of the first sidelink reference signal before the second sidelink data retransmission, or the first device cancels the availability or triggering for transmission of the first sidelink reference signal in response to multiplexing the transmission of the first sidelink reference signal with the first sidelink data retransmission, or the first device cancels the availability or triggering for transmission of the first sidelink reference signal in response to the first device performing the transmission of the first sidelink reference signal for a first number of times.

9. The method of claim 7, wherein the second sidelink data retransmission is not able to multiplex the transmission of the first sidelink reference signal due to no sufficient symbols for multiplexing the transmission of the first sidelink reference signal in the second sidelink data retransmission.

10. The method of claim 1, wherein:

at least a symbol for the first sidelink data retransmission is utilized for the transmission of the first sidelink reference signal, and/or no symbols for the initial sidelink data transmission are kept or utilized for transmission of sidelink reference signal.

11. A method of a first device, comprising:

receiving a configuration of a first sidelink resource pool from a network for sidelink data transmission and/or sidelink reference signal, wherein the sidelink reference signal means sidelink positioning reference signal or sidelink Channel State Information (CSI) reference signal for beam management, and/or the sidelink reference signal is utilized for any of positioning, ranging, beam management, high-resolution localization, sensing, or imaging;

transmitting a first Sidelink Control Information (SCI) and a new sidelink data transmission for transmitting a sidelink data packet to a second device, wherein the first SCI is used for decoding of the new sidelink data transmission and wherein the first SCI does not comprise sidelink reference signal resource-related information;

triggering a first sidelink reference signal for transmission based on a signaling sent from the second device or based on an upper layer of the first device, wherein the first sidelink reference signal means a first sidelink positioning reference signal or a first sidelink CSI reference signal for beam management, and/or the first sidelink reference signal is utilized for any of positioning, ranging, beam management, high-resolution localization, sensing, or imaging;

determining whether to multiplex a transmission of the first sidelink reference signal with a first sidelink data retransmission in a same slot with a same frequency domain resource based on whether the transmission of the first sidelink reference signal is available for the second device; and transmitting a second SCI and the first sidelink data retransmission, for transmitting the sidelink data packet to the second device, wherein if the transmission of the first sidelink reference signal is multiplexed with the first sidelink data retransmission, the second SCI is used for decoding of the first sidelink data retransmission and scheduling of the first sidelink reference signal, and the second SCI comprises sidelink reference signal resource-related information for the transmission of the first sidelink reference signal.

12. The method of claim 11, further comprising:

multiplexing the transmission of the first sidelink reference signal with the first sidelink data retransmission in the same slot with the same frequency domain resource if the first sidelink reference signal is available for the second device; and/or not multiplexing the transmission of the first sidelink reference signal with the first sidelink data retransmission in the same slot if the first sidelink reference signal is not available for the second device.

13. The method of claim 11, wherein:

the first sidelink reference signal is available or triggered, in a first timing later than the new sidelink data transmission, for transmission, and/or the first sidelink reference signal is available or triggered, in the first timing before the first sidelink data retransmission, for transmission.

14. The method of claim 11, wherein the new sidelink data transmission and the first sidelink data retransmission are transmitted in the first sidelink resource pool.

15. The method of claim 11, wherein:

the transmission of the first sidelink reference signal and the first sidelink data retransmission are associated with any of a same destination Identity (ID), a same source ID, and/or a same cast type, and/or the transmission of the first sidelink reference signal and the sidelink data packet are associated with any of the same destination ID, the same source ID, and/or the same cast type, and/or the second device is identified by the same destination ID or associated with the same destination ID.

16. The method of claim 11, wherein:

at least a symbol for the first sidelink data retransmission is utilized for the transmission of the first sidelink reference signal, and/or no symbols for the new sidelink data transmission are kept or utilized for the transmission of sidelink reference signal.

17. The method of claim 11, wherein:

the new sidelink data transmission means a new or initial Physical Sidelink Shared Channel (PSSCH) transmission, and/or the first sidelink data retransmission means a first PSSCH retransmission, and/or the sidelink reference signal means sidelink positioning reference signal, and/or the sidelink reference signal means sidelink Channel State Information (CSI) reference signal for beam management, and/or the sidelink reference signal is utilized for any of positioning, ranging, beam management, high-resolution localization, sensing, or imaging, and/or the first sidelink reference signal means a first sidelink positioning reference signal, and/or the first sidelink reference signal means a first sidelink CSI reference signal for beam management, and/or the first sidelink reference signal is utilized for any of positioning, ranging, beam management, high-resolution localization, sensing, or imaging.

18. A first device, comprising:

a memory; and a processor operatively coupled with the memory, wherein the processor is configured to execute a program code to:

receive a configuration of a first sidelink resource pool for sidelink data transmission and/or sidelink reference signal, wherein the sidelink reference signal means sidelink positioning reference signal or sidelink Channel State Information (CSI) reference signal for beam management, and/or the sidelink reference signal is utilized for any of positioning, ranging, beam management, high-resolution localization, sensing, or imaging;

transmit a first Sidelink Control Information (SCI) and an initial sidelink data transmission for transmitting a sidelink data packet, wherein the first SCI is used for decoding of the initial sidelink data transmission and wherein the first SCI does not comprise sidelink reference signal resource-related information; and transmit a second SCI and a first sidelink data retransmission, for transmitting the sidelink data packet, with multiplexing a transmission of a first sidelink reference signal, wherein:

the first sidelink reference signal means a first sidelink positioning reference signal or a first sidelink CSI reference signal for beam management, and/or the first sidelink reference signal is utilized for any of positioning, ranging, beam management, high-resolution localization, sensing, or imaging, the first sidelink reference signal is available or triggered, after the initial sidelink data transmission, for transmission, the second SCI is used for decoding of the first sidelink data retransmission and scheduling of the first sidelink reference signal, the second SCI comprises sidelink reference signal resource-related information for the transmission of the first sidelink reference signal, and the first sidelink data retransmission and the transmission of the first sidelink reference signal are multiplexed in a same slot with a same frequency domain resource.

19. The first device of claim 18, wherein the initial sidelink data transmission does not multiplex the transmission of the first sidelink reference signal.

20. The first device of claim 18, wherein:

the first sidelink reference signal is available or triggered, in a first timing later than the initial sidelink data transmission, for transmission, and/or the first sidelink reference signal is available or triggered, in the first timing before the first sidelink data retransmission, for transmission.

21. The first device of claim 18, wherein the initial sidelink data transmission and the first sidelink data retransmission are transmitted in the first sidelink resource pool.

22. The first device of claim 18, wherein:

the transmission of the first sidelink reference signal and the first sidelink data retransmission are associated with any of a same destination Identity (ID), a same source ID, and/or a same cast type, and/or the transmission of the first sidelink reference signal and the same sidelink data packet are associated with any of the same destination ID, the same source ID, and/or the same cast type.

* * * * *